(12) United States Patent
Soeda et al.

(10) Patent No.: US 8,570,597 B2
(45) Date of Patent: Oct. 29, 2013

(54) IMAGE FORMING APPARATUS AND IMAGE FORMING METHOD WHICH ENHANCE GRAININESS AND ALSO REDUCE A TOTAL TONER AMOUNT WITHOUT DETERIORATING IMAGE QUALITY IN IMAGE FORMATION USING TONER OF HIGH CHROMA

(75) Inventors: Kaori Soeda, Tokyo (JP); Koji Washio, Tokyo (JP); Hidemasa Sawada, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 304 days.

(21) Appl. No.: 13/033,245

(22) Filed: Feb. 23, 2011

(65) Prior Publication Data

US 2011/0216381 A1 Sep. 8, 2011

(30) Foreign Application Priority Data

Mar. 2, 2010 (JP) ................................ 2010-044820

(51) Int. Cl.
- *G06F 3/12* (2006.01)
- *G06F 15/00* (2006.01)
- *H04N 1/60* (2006.01)
- *H04N 1/40* (2006.01)
- *G06K 15/00* (2006.01)
- *G06K 9/00* (2006.01)

(52) U.S. Cl.
USPC ........... 358/1.9; 358/1.1; 358/1.15; 358/3.01; 358/3.03; 382/162; 382/163; 382/167

(58) Field of Classification Search
USPC .......... 358/1.9, 1.1, 1.2, 2.1, 1.15, 1.16, 1.18, 358/3.26, 3.02, 518, 448, 523, 530, 466, 358/534, 536, 452, 451, 453, 426.06, 444, 358/462, 521, 524, 532, 533, 537, 504, 538, 358/515, 527; 382/252, 237, 167, 168, 270, 382/164, 165, 287, 162, 254, 266, 166, 176, 382/180, 195, 251, 269, 274, 303; 399/9, 399/15, 38, 53, 60, 72
See application file for complete search history.

(56) References Cited

U.S. PATENT DOCUMENTS

| 4,701,790 | A * | 10/1987 | Yamada ........................ 358/515 |
| 5,084,762 | A * | 1/1992 | Miyakawa .................... 358/529 |
| 2009/0291376 | A1* | 11/2009 | Hirano et al. ................... 430/97 |

FOREIGN PATENT DOCUMENTS

JP 2006-279922 10/2006

OTHER PUBLICATIONS

X-Rite, A Guide to Understanding Color Communication, Mar. 2007, X-rite Corporation, L10-001, All Pages.*
Brewer et al., An Objective Method for Determination of Equivalent Neutral Densities of Color Film Images, Jun. 1954, Journal Of The Optical Society Of America, vol. 44 No. 6, All Pages.*

* cited by examiner

Primary Examiner — Ngon Nguyen
(74) Attorney, Agent, or Firm — Lucas & Mercanti, LLP

(57) ABSTRACT

Disclosed is an image forming apparatus including a color converter for converting cyan, magenta and yellow components of a first image signal to equivalent neutral density, calculating a first gray component from cyan, magenta and yellow components of equivalent neutral density, subtracting the first gray component from each of the cyan, magenta and yellow components of equivalent neutral density, subjecting each of the cyan, magenta and yellow components of equivalent neutral density from which the first gray component is subtracted to an inverse conversion of the equivalent neutral density conversion, and outputting a second image signal comprising cyan, magenta and yellow components which are obtained by carrying out the inverse conversion to the cyan, magenta and yellow components of equivalent neutral density from which the first gray component is subtracted, the first black component and the first gray component; an image forming section for forming an image on a paper based on the second image signal by using cyan, magenta, yellow, black and gray toners; and a controller for controlling the color converter and the image forming section.

5 Claims, 11 Drawing Sheets

IMAGE FORMING APPARATUS AND IMAGE FORMING METHOD WHICH ENHANCE GRAININESS AND ALSO REDUCE A TOTAL TONER AMOUNT WITHOUT DETERIORATING IMAGE QUALITY IN IMAGE FORMATION USING TONER OF HIGH CHROMA

BACKGROUND OF THE INVENTION

1. Field of the Invention

The present invention relates an image forming apparatus and an image forming method.

2. Description of Related Art

An image forming apparatus such as a copying machine or the like for performing color print has been known. In the color print, four color toners or inks of Y (yellow), M (magenta), C (cyan) and K (black) are used often. For example, color print (image formation) has been performed by using toners of YMCK in an electrophotographic image forming apparatus.

The toner K among the above toners express achromatic colors, however, the achromatic colors can be also expressed by blending the toners of CMY. However, because the achromatic colors based on only CMY is low in the maximum density, thus a large amount of K is used for acromatic colors of middle and high densities. Conversely, the achromatic colors can be reproduced by only a simple color of K. However, the boundary between the chromatic color and the achromatic color becomes remarkable when the color is continuously varied from a chromatic color to an achromatic color and graininess becomes remarkable when the achromatic color is expressed only by the simple color of K causing deterioration of image quality. Therefore, the achromatic colors are expressed by CMYK in general.

Furthermore, in recent years, there is a case where high chroma toners having higher chroma than normal toners are used as toners of CMY to expand the reproducible color gamut. Here, the density characteristics of the normal toner and the high chroma toners will be described with reference to FIGS. 11A and 11B. FIG. 11A shows a toner-based density with respect to a print density for normal CMY toners and a black toner. FIG. 11B shows a toner-based density with respect to a print density for CMY toners of high chroma toners and a black toner.

FIGS. 11A and 11B are color separation curves showing how the CMY toners and the black toner are to be used to reproduce achromatic density when using the normal toners and the high chroma toners. In FIGS. 11A and 11B, an ideal tone curve is represented by a dashed line, a tone curve of CMY toners which are normal toners is represented by a broken line, a tone curve of CMY toners which are high chroma toners is represented by a one-dotted chain line, and a tone curve of a black toner is represented by solid line. The print density shown in the horizontal axis of each graph indicates finished target print density. With respect to the density, the density at a point of 0 is defined as white, and the color approaches to black as the value of density increases and is defined as black at a point at which the value thereof is largest in the graph. The toner-based density shown in the vertical axis indicates the density of toner of each color. The tone curve of the CMY toners is assumed to represent the density (equivalent neutral density) when the C, M, Y toners are blended to form an achromatic color.

The high chroma toners can mainly expand the color gamut of colors having high brightness, however, they have a feature that sufficient densities of achromatic colors cannot be obtained even when the CMY toners are blended. That is, the high chroma toners cannot reproduce colors having low brightness. As compared with the normal CMY toners shown in FIG. 11A, colors of low brightness cannot be reproduced when the CMY toners which are high chroma toners shown in FIG. 11 are used, and thus there is a need to start using K alternatively in low density colors.

Furthermore, with respect to the color print, particularly for the electrophotographic process, there is an image forming apparatus in which the maximum toner use amount is limited (see for example, JP-A-2006-279922).

The reason why the maximum toner use amount is limited is as follows. That is, when an excessively large amount of toner is put on a paper, the toner melted in a fixing step cannot be removed from a fixing roller, and consequently there occurs a phenomenon that the paper having the toner thereon cannot be separated from the fixing roller and thus the paper is to be twined around the fixing roller. Once this phenomenon occurs, the apparatus cannot continue the print operation. Therefore, an operator must stop the image forming apparatus and perform a work of removing the paper from the fixing unit and the like. As described above, because there is a large operational demerit such as reduction in the working efficiency, wasting of materials and the like, such phenomenon is prevented by limiting the maximum toner amount.

The maximum toner amount limitation is implemented by executing a control operation of calculating a total toner amount of C+M+Y+K for each pixel at a signal processing stage in advance, and forcedly reducing signal values of CMY when the total toner amount exceeds a prescribed value in each pixel. With respect to the toner amount, for convenience of calculation, the signal values are calculated on the assumption that the each signal value is proportional to the toner amount, and here, the calculation of converting each signal value to the toner amount is omitted. For example, when it is assumed that original signal values are represented by C, M, Y and K and the signal values obtained by subjecting these original signal values to the maximum toner amount limitation are represented by Ctr, Mtr, Ytr and Ktr, the following calculations shown by the pseudo codes are performed for each pixel, thereby limiting the maximum toner amount.

```
"Ktr = K
total = C+M+Y+K
If [Total > Limit]
Over = Total - Limit
Ctr = C - Over/3
Mtr = M - Over/3
Ytr = Y - Over/3
Else
Ctr = C
Mtr = M
Ytr = Y"
```

First, a variable is output as it is because the variable "K" is not subjected to the toner amount limitation. Subsequently, the respective signal values of variables "C", "M", and "K" are added and the sum thereof is set as a variable "Total". When the variable "Total" exceeds a predetermined maximum toner amount "Limit", the variable "Over" corresponding to the excessive amount is first calculated, and this value is subtracted from each of the variables "C", "M", and "Y" equally (or in a ratio based on gray balance) to calculate variables "Ctr", "Mtr", and "Ytr". In the other cases (when the variable "Total" does not exceed the predetermined toner amount "Limit"), Ctr=C, Mtr=M and Ytr=Y are output.

However, a phenomenon that graininess in a low density area is deteriorated when a black toner is used in the low density area occurs in the conventional image forming apparatus using the high chroma toners. The cause for this resides in that the graininess of the black toner as simple substance is worse (larger) than color toners. The graininess is worse as the dynamic range of the density is larger. The black toner has a large dynamic range of the density and thus the graininess is bad.

On the other hand, with respect to the high chroma toners, the dynamic range of the density thereof is small, and thus the graininess thereof is low (good). Conversely, this feature makes the badness of the graininess of the black toner relatively remarkable. This is elicited when flesh color is reproduced.

Furthermore, when the maximum toner amount limitation acts on pixels in the conventional image forming apparatus using high chroma toners, the image density of the pixels is lowered, and thus required high density is not obtained and image information is also lost, and thus the image quality is degraded.

SUMMARY OF THE INVENTION

An object of the present invention is to provide an image forming apparatus in which graininess is enhanced and also a total toner amount is reduced without deteriorating image quality in image formation using toner of high chroma.

Therefore, an image forming apparatus according to an aspect of the present invention comprises:

a color converter for converting a cyan component, a magenta component and a yellow component of a first image signal comprising the cyan component, the magenta component, the yellow component and a first black component to equivalent neutral density, calculating a first gray component from an equivalent neutral density cyan component, an equivalent neutral density magenta component and an equivalent neutral density yellow component, subtracting the first gray component from each of the equivalent neutral density cyan component, the equivalent neutral density magenta component and the equivalent neutral density yellow component, subjecting each of the equivalent neutral density cyan component, the equivalent neutral density magenta component and the equivalent neutral density yellow component from which the first gray component is subtracted to an inverse conversion of a conversion to the equivalent neutral density, and outputting a second image signal comprising a cyan component, a magenta component and a yellow component which are obtained by carrying out the inverse conversion to the equivalent neutral density cyan component, the equivalent neutral density magenta component and the equivalent neutral density yellow component from which the first gray component is subtracted, the first black component and the first gray component;

an image forming section for forming an image on a paper based on the second image signal by using a cyan toner, a magenta toner, a yellow toner, a black toner and a gray toner; and a controller for controlling the color converter and the image forming section, wherein brightness of a cyan toner simple color image that has maximum chroma is between 53 and 70, brightness of a magenta toner simple color image that has maximum chroma is between 31 and 51, chroma of a gray toner simple color image is equal to 10 or less, and brightness of the gray toner simple color image is between 30 and 90.

In the image forming apparatus, the color converter preferably includes:

an equivalent neutral density converter for converting the cyan component, the magenta component and the yellow component of the first image signal to the equivalent neutral density cyan component, the equivalent neutral density magenta component and the equivalent neutral density yellow component a LUT;

a gray replacing processor for calculating the first gray component from the equivalent neutral density cyan component, the equivalent neutral density magenta component and the equivalent neutral density yellow component which are converted by the equivalent neutral density converter, and subtracting the first gray component from each of the equivalent neutral density cyan component, the equivalent neutral density magenta component and the equivalent neutral density yellow component of the equivalent neutral density; and an equivalent neutral density inverse converter for executing the inverse conversion of the conversion to the equivalent neutral density on each of the equivalent neutral density cyan component, the equivalent neutral density magenta component and the equivalent neutral density yellow component from which the first gray component is subtracted by the gray replacing processor by using a LUT.

In the image forming apparatus, the color converter preferably further includes:

a calculator for calculating a second black component and a second gray component from the first black component and replacing the first black component to the second black component and the second gray component; and an adder for adding the first gray component and the second gray component.

In the image forming apparatus, the color converter preferably includes a three-dimensional LUT color converter for converting the first image signal to the second image signal by using a three-dimensional LUT for performing a conversion processing same as a processing of converting the cyan component, the magenta component and the yellow component of the first image signal to the equivalent neutral density cyan component, the equivalent neutral density magenta component and the equivalent neutral density yellow component, calculating a first gray component from the equivalent neutral density cyan component, the equivalent neutral density magenta component and the equivalent neutral density yellow component which are converted, subtracting the first gray component from each of the equivalent neutral density cyan component, the equivalent neutral density magenta component and the equivalent neutral density yellow component, and performing the inverse conversion of the conversion to the equivalent neutral density on each of the equivalent neutral density cyan component, the equivalent neutral density magenta component and the equivalent neutral density yellow component from which the first gray component is subtracted.

In the image forming apparatus, the color converter preferably includes:

a four-dimensional LUT color converter for converting the first image signal by using four-dimensional LUT for performing a conversion processing same as a processing of converting the cyan component, the magenta component and the yellow component of the first image signal to the equivalent neutral density cyan component, the equivalent neutral density magenta component and the equivalent neutral density yellow component, calculating the first gray component from the equivalent neutral density cyan component, the equivalent neutral density magenta component and the equivalent neutral density yellow component, subtracting the first gray component from each of the equivalent neutral density cyan component, the equivalent neutral density magenta component and the equivalent neutral density yellow component, calculating a second gray component from the first black component, subtracting the second gray component from the first black component, and adding the first gray component and the second gray component; and an equivalent neutral density inverse converter for executing the inverse conversion of the conversion of the equivalent neutral density on each the equivalent neutral density cyan component, the equivalent neutral density magenta component and the equivalent neutral density yellow component after the conversion processing is performed by the four-dimensional LUT color converter by using a LUT.

In the image forming apparatus, brightness of a toner image that has maximum chroma in a yellow toner simple color image is between 80 and 90.

Furthermore, an image forming method according to another aspect of the present invention comprises:

color converting in which a cyan component, a magenta component and a yellow component of a first image signal comprising the cyan component, the magenta component, the yellow component and a first black component are converted to equivalent neutral density, a first gray component is calculated from an equivalent neutral density cyan component, an equivalent neutral density magenta component and an equivalent neutral density yellow component, the first gray component is subtracted from each of the equivalent neutral density cyan component, the equivalent neutral density magenta component and the equivalent neutral density yellow component, each of the equivalent neutral density cyan component, the equivalent neutral density magenta component and the equivalent neutral density yellow component from which the first gray component is subtracted is subjected to an inverse conversion of a conversion to the equivalent neutral density, and a second image signal comprising a cyan component, a magenta component and a yellow component which are obtained by carrying out the inverse conversion to the equivalent neutral density cyan component, the equivalent neutral density magenta component and the equivalent neutral density yellow component from which the first gray component is subtracted, the first black component and the first gray component is output; and image forming in which an image is formed on a paper based on the second image signal by using a cyan toner, a magenta toner, a yellow toner, a black toner and a gray toner by an image forming section, wherein brightness of a cyan toner simple color image that has maximum chroma is between 53 and 70, brightness of a magenta toner simple color image that has maximum chroma is between 31 and 51, chroma of a gray toner simple color image is equal to 10 or less, and brightness of the gray toner simple color image is between 30 and 90.

BRIEF DESCRIPTION OF THE DRAWINGS

The present invention will be perfectly understood with the following detailed description and accompanying drawings. However, they do not limit the present invention. Here.

DETAILED DESCRIPTION OF THE PREFERRED EMBODIMENT

Figure 1:
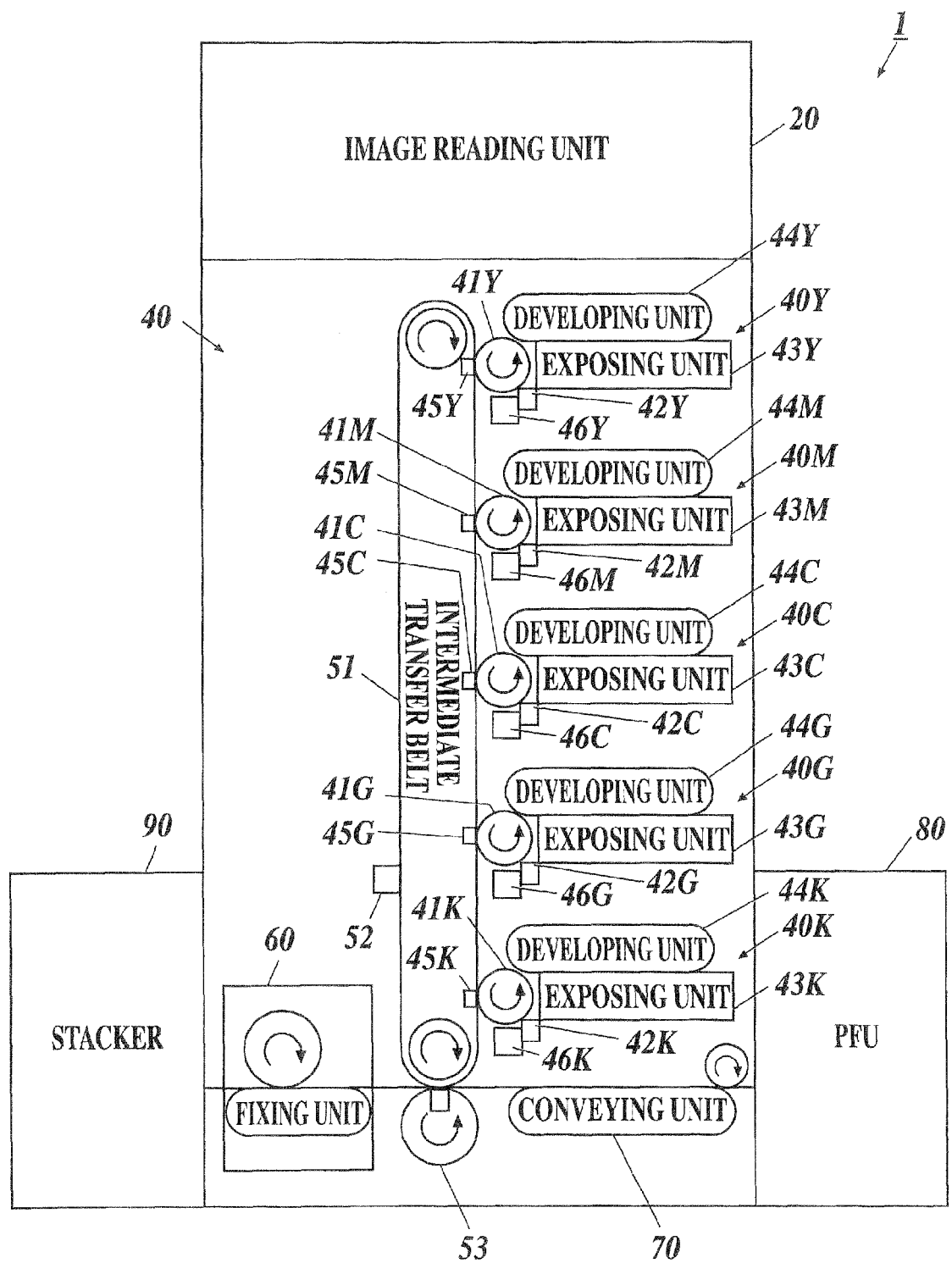
FIG. 1 is a diagram showing the overall structure of an image forming apparatus according to an embodiment of the present invention.

A preferred embodiment according to the present invention and first to third modifications thereof will be described in this order in detail with reference to the accompanying drawings. The present invention is not limited to the examples shown in the drawings.

The structure of an apparatus according to the embodiment will be described with reference to FIGS. 1 to 4. First, the overall structure of an image forming apparatus 1 according to the embodiment will be described. FIG. 1 shows the overall structure of the image forming apparatus 1 according to the embodiment.

The image forming apparatus 1 according to the embodiment is an image forming apparatus as a copying machine for performing electrophotographic type color image formation. However, the present invention is not limited to the copying machine, and it may be applied to other image forming apparatuses such as a printer and the like.

The image forming apparatus 1 forms an image by using five color toners of C, M, Y, K and G (gray). The black toner used in the image forming apparatus 1 is a normal black toner. The cyan toner, magenta toner and yellow toner used in the image forming apparatus 1 are high chroma toners.

The yellow toner used in the image forming apparatus 1 is a high chroma toner in which the brightness L*Y of the yellow toner simple color image that has maximum chroma falls in the range from 80 to 90. Furthermore, the magenta toner used in the image forming apparatus 1, is a high chroma toner in which the brightness L*M of the magenta toner simple color image that has maximum chroma falls in the range from 35 to 51. The cyan toner used in the image forming apparatus 1 is a high chroma toner in which the brightness L*C of the cyan toner simple color image that has maximum chroma falls in the range from 53 to 70.

Moreover, the gray toner used in the image forming apparatus 1 is an achromatic color toner in which the chroma C*G of a gray toner simple color image is equal to 10 or less and the brightness L*G of the gray toner simple color image ranges from 30 to 90.

The more detailed definition of the yellow toner, the magenta toner, the cyan toner and the gray toner used in the image forming apparatus 1 is as follows. However, it is assumed that the following is a feature in a toner simple color image when the image is formed on a white transfer sheet of brightness of 92, for example "POD gloss coat paper" at a toner adhering amount of 4 [g/m$^2$].

Here, the reflection spectrum of each toner simple color image is measured by using a spectrophotometer "Gretag Macbeth Spectrolino" (manufactured by Gretag Macbeth company). With respect to a measurement condition, D65 light source is used as a light source, a reflection measurement aperture of φ4 mm is adopted as a reflection measurement aperture, a measurement wavelength region from 380 to 730 nm is measured at an interval of 10 nm, a view angle (observer) is set to 2° and a dedicated white tile is used for reference matching.

The brightness L* of each toner simple color image is defined by an L*a*b* type color coordinate system. Here, the L*a*b* type color coordinate system is one of methods used to express a color in a numerical value, and L* is a Z-axis coordinate which represents brightness and a* and b* are X-axis and Y-axis coordinates respectively which represent hue and chroma in combination. The brightness means relative luminance of a color, the hue means coloration of red, yellow, green, blue, purple or the like, and the chroma means the degree of vividness of color and is defined by the following formula (1).

That is, the chroma is defined as the distance of the coordinate point (a,b) from the origin O, and is calculated by the following formula (1)

$$\text{Chroma } C^* = [(a^*)^2 + (b^*)^2]^{1/2} \quad (1)$$

Furthermore, in the L*a*b* type color coordinate system, color tone can be explained by a concept of a hue angle. Here, for example, on a x-axis-y-axis plane representing the relationship between hue and chroma when brightness has a certain value, a hue angle h is defined as an intersection angle of the x-axis and a half line which connects a certain coordinate point (a,b) and the origin O, and the hue angle h is in a counterclockwise direction from the +direction (red direction) of the x-axis to the half line. The hue angle h is calculated according to the following formula (2).

$$\text{Hue angle } h = \tan^{-1}(b^*/a^*) \quad (2)$$

On the x-axis-y-axis plane, the − (minus) direction of the x-axis represented by a* corresponds to the green direction, the + (plus) direction of the y-axis represented by b* corresponds to the yellow direction, and the − (minus) direction of the y-axis represented by corresponds to the blue direction.

L*a*b* for calculating the chroma c* and the hue angle h is specifically measured by using the spectrophotometer "Gretag Macbeth Spectrolino" (manufactured by Gretag Macbeth). With respect to a measurement condition, as in the case of the measurement of the reflection spectrum, a D65 light source and a reflection measuring aperture of φ4 mm are used, a measurement wavelength region from 380 to 730 nm is measured at an interval of 10 nm, a view angle (observer) is set to 2°, and a dedicated white tile is used for reference matching.

From the viewpoint of coloring of a secondary color, specifically, green and red, it is preferable that the maximum chroma c*Y of the yellow toner simple color image ranges from 85 to 115. The maximum chroma is defined by the following (α) and (β).

(α) When the content of toner coloring agent is set to a large value, first, the chroma increases substantially proportionally as the adhering amount of toner increases. However, when the adhering amount of toner further increases, the increase of the chroma stops and the chroma conversely decreases from a certain point when the adhering amount of toner further increases. At this time, the chroma at the point where the chroma turns from increase to decrease in connection with increase of the adhering amount of toner is defined as the maximum chroma.

On the other hand, (β) when the adhering amount toner and the chroma are proportional in the image forming apparatus, the chroma of a toner image which has the maximum adhering amount of toner on a transfer sheet under a color setting condition of the image forming apparatus is defined as the maximum chroma.

The maximum chroma of a yellow toner simple color image is measured at a hue angle of 75°. At this time, from the viewpoint of coloring of green and red, the brightness L*Y of the yellow toner simple color image which has the maximum chroma is preferably set to be in the range from 80 to 90. Particularly, the brightness L*Y is preferably set to be in the range from 85 to 90.

From the viewpoint of coloring of a secondary color, specifically, blue and red, it is preferable that the maximum chroma c*M of a magenta toner simple color image ranges from 70 to 100. The definition of the maximum chroma is the same as the yellow toner image.

The maximum chroma of the magenta toner simple color image is measured at a hue angle of 315°. At this time, from the viewpoint of coloring of blue, purple and red, the brightness L*M of the magenta toner simple color image which has the maximum chroma is preferably set to be in the range from 35 to 51. Particularly, the brightness L*M is preferably set to be in the range from 40 to 49.

From the viewpoint of coloring of a secondary color, specifically, green and blue, it is preferable that the maximum chroma c*C of a cyan toner simple color image ranges from 50 to 80. The definition of the maximum chroma is the same as the yellow toner image.

The maximum chroma of the cyan toner simple color image is measured at a hue angle of 195°. At this time, from the viewpoint of coloring of greenish yellow, green and blue, the brightness L*C of the cyan toner simple color image which has the maximum chroma is preferably set to be in the range from 53 to 70. Particularly, the brightness L*C is preferably set to be in the range from 57 to 67.

With respect to a gray toner, it is preferable that the maximum chroma c*G of a gray toner simple color image is equal to 10 or less and the brightness L*G of the gray toner simple color image is in the range from 30 to 90. For example, the content of carbon black in the gray toner is set to 0.5 to 3 parts.

Here, with respect to the toner used in the image forming apparatus 1 of this embodiment, coloring agents of the yellow toner, the magenta toner, and the cyan toner, a toner manufacturing method, a binder resin, a release agent, a charge control agent, an external addition treatment step and a developing agent will be successively described.

(Yellow Coloring Agent)

Specifically, a yellow coloring agent contained in the yellow toner may be selected from C.I. pigment yellow 3, C.I. pigment yellow 35, C.I. pigment yellow 65, C.I. pigment yellow 74, C.I. pigment yellow 98, C.I. pigment yellow 111, C.I. pigment yellow 9, C.I. pigment yellow 36, C.I. pigment yellow 83, C.I. pigment yellow 110, C.I. pigment yellow 139, C.I. pigment yellow 181 and C.I. pigment yellow 153. However, the present invention is not limited to these materials.

(Magenta Coloring Agent)

Furthermore, specifically, a coloring agent for the magenta toner implementing the structure of this embodiment is obtained by blending dispersive liquids of the following pigment and dye and adjusting the reflection spectrum. This work does not impose enormous trial and error procedure on a worker.

As examples of a pigment, the following materials may be used: C.I. pigment red 2, C.I. pigment red 3, C.I. pigment red 6, C.I. pigment red 7, C.I. pigment red 9, C.I. pigment red 15, C.I. pigment red 16, C.I. pigment red 48:1, C.I. pigment red 48:3, C.I. pigment red 53:1, C.I. pigment red 57:1, C.I. pigment red 122, C.I. pigment red 123, C.I. pigment red 139, C.I. pigment red 144, C.I. pigment red 149, C.I. pigment red 166, C.I. pigment red 177, C.I. pigment red 178, C.I. pigment red 208, C.I. pigment red 209, C.I. pigment red 222 and the like.

Furthermore, the following materials may be used as examples of a dye: C.I. solvent red 3, C.I. solvent red 14, C.I. solvent red 17, C.I. solvent red 18, C.I. solvent red 22, C.I. solvent red 23, C.I. solvent red 49, C.I. solvent red 51, C.I. solvent red 53, C.I. solvent red 87, C.I. solvent red 127, C.I. solvent red 128, C.I. solvent red 131, C.I. solvent red 145, C.I. solvent red 146, C.I. solvent red 149, C.I. solvent red 150, C.I. solvent red 151, C.I. solvent red 152, C.I. solvent red 153, C.I. solvent red 154, C.I. solvent red 155, C.I. solvent red 156, C.I. solvent red 157, C.I. solvent red 158, C.I. solvent red 176, C.I. solvent red 179 and the like.

Still furthermore, the following compounds 1 to 4 are used as specific examples of compounds usable as a coloring agent for magenta.

[CHEMICAL FORMULA 1]

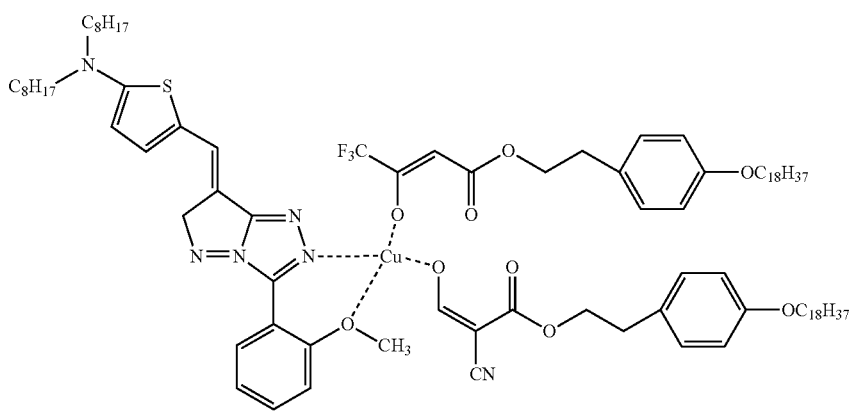

COMPLEX COMPOUND 1

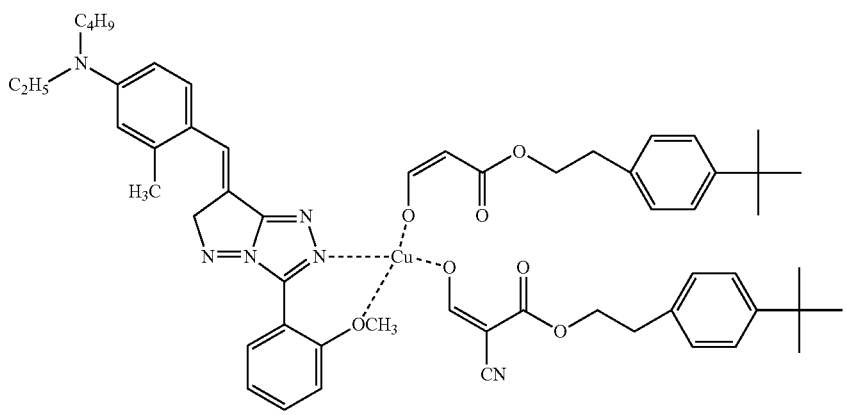

COMPLEX COMPOUND 2

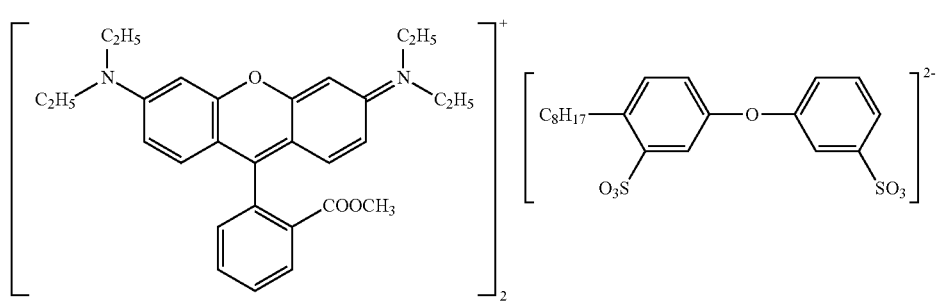

COMPLEX COMPOUND 3

-continued

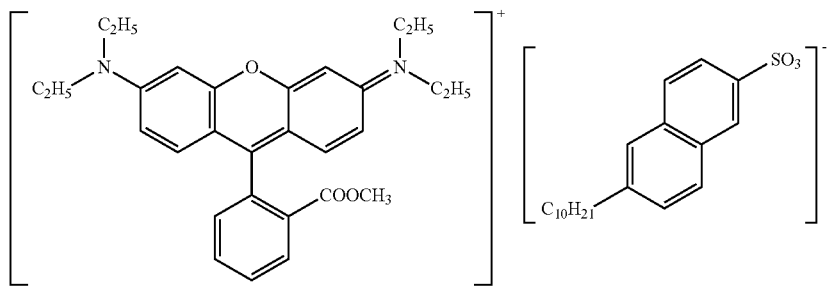

Mixtures of C.I. pigment red 9; C.I. pigment red 208, C.I. pigment red 209 and the compounds 1 to 4 among these materials are preferably used. Furthermore, it is preferable in this embodiment that the above coloring agents are used as the magenta coloring agent in combination.

(Cyan Coloring Agent)

A silicon phthalocyanine compound as one coloring agent available for the cyan toner used in this embodiment will be described. A material which contains at least resin and a coloring agent and also contains a silicon phthalocyanine compound represented by the following general formula (I) as a coloring agent is known as one cyan toner which achieves the advantage of this embodiment. In the silicon phthalocyanine compound represented by the general formula (I), silicon atom (Si) is located at the center of a phthalocyanine ring (hereinafter, also referred to as central atom).

[CHEMICAL FORMULA 2]

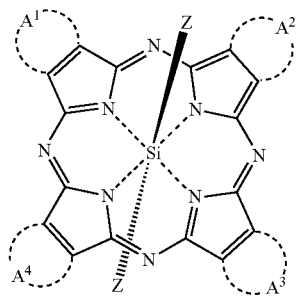

GENERAL FORMULA (I)

Each Z in the general formula (I) independently represents any one of hydroxyl group, chloride, aryloxy group of carbon number of 6 to 18, alkoxy group of carbon number of 1 to 22 and a compound represented by the following general formula (IV).

[CHEMICAL FORMULA 3]

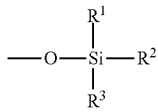

GENERAL FORMULA (IV)

$R^1$, $R^2$ and $R^3$ in the general formula (IV) represent any one of alkyl group of carbon number of 1 to 22, aryl group of carbon number of 6 to 18, alkoxy group of carbon number of 1 to 22 or aryloxy group of carbon number 6 to 18. The $R^1$, $R^2$ and $R^3$ may be of the same group or of different groups. Furthermore, the $R^1$, $R^2$ and $R^3$ represent any one of alkyl group, aryl group, alkoxy group and aryloxy group of the above carbon numbers. However, the carbon numbers of these groups preferably range from 1 to 10, and more preferably range from 2 to 8.

Furthermore, each of $A^1$, $A^2$, $A^3$ and $A^4$ in the general formula (I) independently represents a benzene ring.

In the silicon phthalocyanine compound represented by the general formula (I), a silicon atom is used as the central atom and has an axial ligand represented by Z, and is also called as a tetraazaporphyrin compound. A toner containing the compound represented by the general formula (I) has better color reproducibility than the toner containing phthalocyanine compound having no axial ligand. This would be because the silicon phthalocyanine compound having the axial ligand represented by the general formula (I) has more complicated structure than the silicon phthalocyanine compound having no axial ligand and thus condensation and crystallization hardly occur in toner particles of the former compound. Accordingly, the silicon phthalocyanine compound as coloring agent is easily and uniformly dispersed in cyan toner particles or in a fixed image, so that the reproducibility can be more enhanced:

Furthermore, it is estimated that the phthalocyanine compound has a structure that condensation and crystallization hardly occur, so that compatibility to a binder resin in toner or solubility to a solvent or a polymerizable monomer is enhanced and the phthalocyanine compound is easily and uniformly dispersed in the toner manufacturing process, and thus excellent color reproducibility can be achieved.

The group represented by the general formula (IV) among the groups described above is particularly preferable as the axial ligand Z constituting the compound represented by the general formula (I). The $R^1$, $R^2$ and $R^3$ in the groups represented by the general formula (IV) are preferably any one of alkyl group, aryl group and alkoxy group of carbon numbers of 1 to 6, and particularly preferably any one of n-propyl group, isopropyl group, n-butyl group, isobutyl group and t-butyl group. Furthermore, the $R^1$, $R^2$ and $R^3$ may be of the same group or of different groups.

In the cyan toner used in this embodiment, the phthalocyanine compound described above may be used alone or a plurality of kinds of phthalocyanine compounds may be used in combination. The content of the phthalocyanine compound in the toner is set in the range from 1 to 30 weight % with respect to the whole toner, preferably from 2 to 20 weight %. Particularly, the compound is expected to have high molecular absorption performance, thus, it is expected that the phthalocyanine compound achieves the advantage of this embodiment even when the addition amount thereof is small.

Table 1 shows specific examples of tetraazaporphyrin compound (phthalocyanine compound having axial ligand) represented by the general formula (I). However, the compounds represented by the general formula (I) which are usable for the toner according to this embodiment is not limited to those shown in the table 1.

TABLE 1

| COMPOUND No. | ATOMIC GROUP ($A^1, A^2, A^3, A^4$) | Z | SUBSTITUENT |
|---|---|---|---|
| I-1 | BENZENE RING | —O—Si(CH$_2$CH$_3$)$_3$ | |
| I-2 | BENZENE RING | —OH | |
| I-3 | BENZENE RING | —O—Si(CH$_2$CH$_2$CH$_3$)$_3$ | |
| I-4 | BENZENE RING | —O—Si(CH$_3$)$_3$ | |
| I-5 | BENZENE RING | —O—Si(CH(CH$_3$)$_2$)$_3$ | |
| I-6 | BENZENE RING | —Cl | |
| I-7 | BENZENE RING | —O—Si(CH$_2$CH$_2$CH$_2$CH$_2$CH$_2$CH$_2$CH$_2$CH$_3$)(CH$_3$)$_2$ | |
| I-8 | BENZENE RING | —O—Si(t-C$_4$H$_9$)$_3$ | |
| I-9 | BENZENE RING | —O—Si(CH$_2$CH$_3$)$_3$ | CHLORO GROUP (MONOCHLORO) |
| I-10 | BENZENE RING | —O—Si(CH$_2$CH$_3$)$_3$ | CHLORO GROUP (DICHLORO) |
| I-11 | BENZENE RING | —O—Si(CH$_2$CH$_3$)$_3$ | TRIFLUOROMETHYL GROUP |
| I-12 | BENZENE RING | —O—Si(C$_{11}$H$_{23}$)(CH$_3$)$_2$ | |
| I-13 | BENZENE RING | —O—Si(C$_{22}$H$_{45}$)(CH$_2$CH$_3$)(CH$_3$) | |
| I-14 | BENZENE RING | —O—Si(CH$_2$CH$_3$)(CH$_3$)(C$_6$H$_5$) | |
| I-15 | BENZENE RING | —O—Si(CH$_2$CH$_3$)(CH$_3$)(C$_{18}$H$_{11}$) | |
| I-16 | BENZENE RING | —O—Si(OCH$_3$)(OC$_{22}$H$_{45}$)CH$_3$ | |
| I-17 | BENZENE RING | —O—Si(OC$_2$H$_5$)$_2$(OC$_{10}$H$_{21}$) | |
| I-18 | BENZENE RING | —O—CH$_3$ | |
| I-19 | BENZENE RING | —O—CH$_2$CH$_3$ | |
| I-20 | BENZENE RING | —O—CH$_2$(CH$_2$)$_6$CH$_3$ | |
| I-21 | BENZENE RING | —O—C$_{11}$H$_{23}$ | |
| I-22 | BENZENE RING | —O—C$_{22}$H$_{25}$ | |
| I-23 | BENZENE RING | —O—C$_6$H$_5$ (PHENOXY GROUP) | |
| I-24 | BENZENE RING | —O—C$_{10}$H$_7$ (NAPHTHOXY GROUP) | |
| I-25 | BENZENE RING | —O—C$_{14}$H$_9$ (ANTHRYLOXY GROUP) | |
| I-26 | BENZENE RING | —O—C$_{16}$H$_9$ (PYRENYLOXY GROUP) | |
| I-27 | BENZENE RING | —O—C$_{18}$H$_{11}$ | |

The compounds (1-4) among the silicon phthalocyanine compounds shown in the table 1 are particularly preferable.

Furthermore, compounds represented by the following general formula (II) are used as a coloring agent which is used in combination with the above-described silicon phthalocyanine compound in this embodiment.

[CHEMICAL FORMULA 4]

GENERAL FORMULA (II)

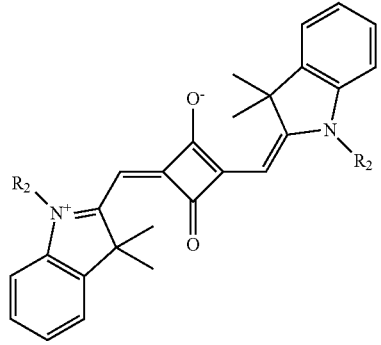

R2 constituting the above general formula (II) represents a hydrogen atom or an organic group. Furthermore, the following materials are used as specific examples of the compounds represented by the general formula (II).

[CHEMICAL FORMULA 5]

(II-1)

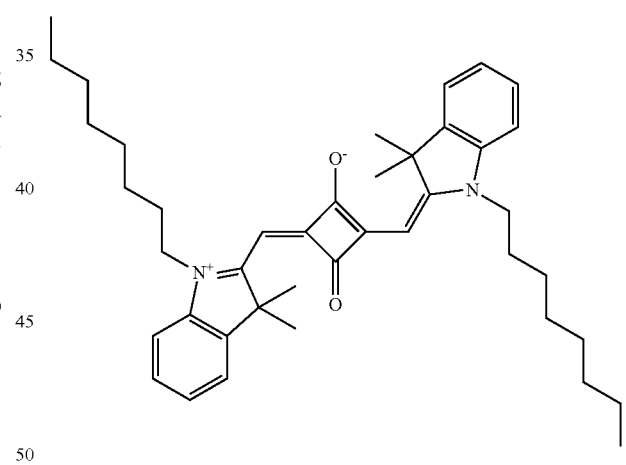

(II-2)

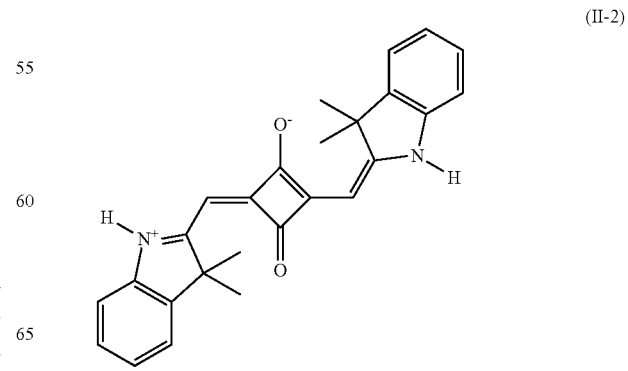

-continued

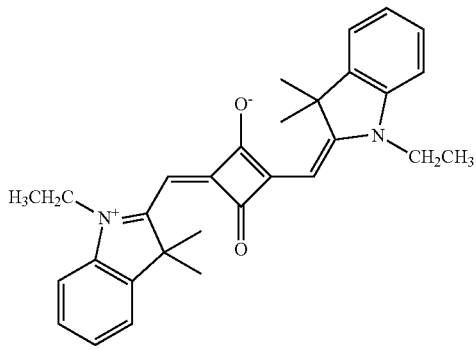
(II-3)

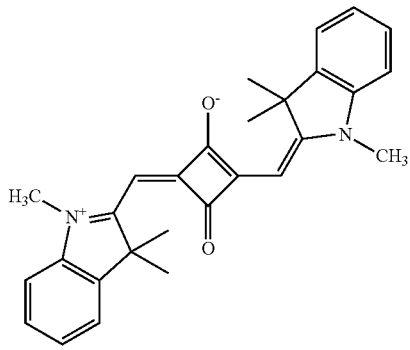
(II-4)

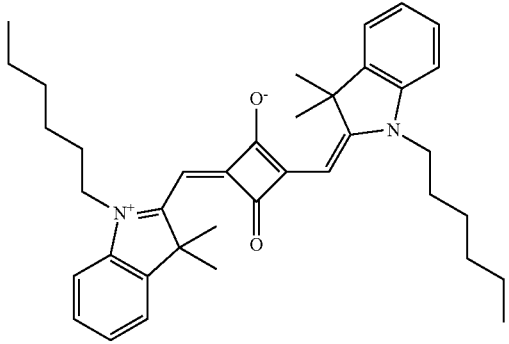
(II-5)

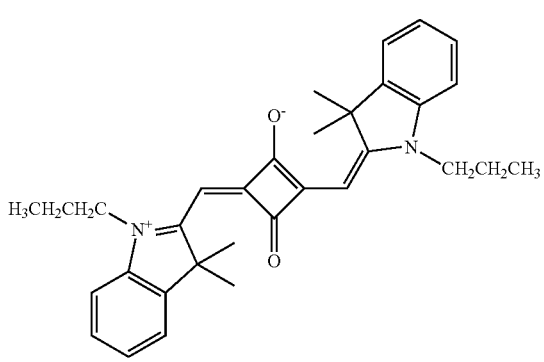
(II-6)

(Toner Manufacturing Method)

A kneading/pulverizing method, a suspension polymerization method, an emulsion polymerization condensation method, a mini-emulsion polymerization condensation method, an encapsulation method and other known methods may be used as a method of manufacturing toner used in this embodiment.

(Binder Resin)

Toner particles constituting the toner used in this embodiment are manufactured by a pulverizing method, a solution suspension method, an emulsion polymerization method or the like, for example. As for the binder resin constituting the toner, may be used are vinyl resin such as styrene resin, (meta) acrylic resin, styrene-(meta) acrylic copolymer resin, olefin resin or the like, polyester resin, polyamide resin, polycarbonate resin, polyether resin, polyvinyl acetate resin, polysulfone resin, epoxy resin, polyurethane resin, urea resin or other well-known resin.

(Release Agent)

A release agent contributing to suppression of an offset phenomenon may be contained in toner particles constituting the toner used in this embodiment. Here, the release agent is not limited to a specific material, and for example, polyolefin wax such as polyethylene wax, polypropylene wax or the like, branched chain hydrocarbon wax such as micro crystalline wax or the like, long-chain hydrocarbon wax such as paraffin wax, sasol wax or the like, dialkyl ketone wax such as distearyl ketone or the like, ester wax such as carnauba wax, montan wax, behenic acid behenate, trimethylol propane tribehenate, pentaerythritol tetrabehenate, pentaerythritol diacetate dibehenate, glycerin tribehenate, 1,18-octadecanediol distearate, tristearyl trimellitic acid, distearyl maleate or the like, amid wax such as ethylenediamine behenylamid or the like may be used.

(Charge Control Agent)

A charge control agent may be contained in toner particles constituting the toner used in this embodiment as occasion demands. Various kinds of well-known compounds may be used as the charge control agent.

(External Addition Treatment Step)

Coloring particles serving as the toner used in this embodiment may constitute toner particles as they are. However, for the purpose of improving fluidity and charging performance and enhancing cleaning performance, the color particles may be added with so-called external addition agent to form toner particles. The external addition agent is not limited to a specific material, however, various kinds of inorganic fine particles, organic fine particles or aliphatic metal salt may be used.

Inorganic oxide particles such as silica, titania, alumina or the like are preferably used as the inorganic fine particles. These inorganic fine particles are preferably subjected to a hydrophobic treatment using silane coupling agent, titan coupling agent or the like.

Furthermore, spherical organic fine particles whose number average primary particle diameter is about 10 to 2000 nm may be used as the organic fine particles. Polystyrene, polymethylmethacrylate or styrene-methylmethacrylate copolymer may be used as the organic fine particles.

The addition rate of these external addition agent is set 0.1 to 5.0 weight % in toner, preferably 0.5 to 4.0 weight % in toner. Further, various kinds of external addition agents may be used in combination.

(Developing Agent)

The toner usable in this embodiment can be used as a non-magnetic one-component developing agent, however, it may be mixed with a carrier and used as a two-component developing agent. When the toner is used as the two-component developing agent, magnetic particles formed of well-known material such as a metal such as iron, ferrite, magnetite or the like, alloy of these metal and another metal such as aluminum, lead or the like are preferably used as the carrier. Particularly, ferrite particles are preferably used. Furthermore, as the carrier, may be used are a coat carrier in which the surface of magnetic particles are coated with a coating agent such as resin or the like, binder type carrier in which magnetic material fine powder is dispersed in binder resin or the like.

The coating resin constituting the coat carrier is not limited to a specific material, however, the coating resin may be formed of polyolefin resin, polystyrene resin, styrene-acrylic copolymer resin, silicone resin, polyester resin, fluorocarbon resin or the like. Furthermore, the binder resin constituting the binder type carrier is not limited to a specific material, and well-known materials may be used, and for example, styrene-acrylic copolymer resin, polyester resin, fluorocarbon resin, phenol resin or the like may be used.

Since the carrier provides a high-quality image and also suppresses carrier blushing, the median diameter of the carrier based on the volume is preferably set in the range from 20 to 100 μm, and more preferably in the range from 20 to 60 μm. The median diameter of the carrier based on the volume can be typically measured by a laser diffraction type grain size distribution measuring apparatus having wet dispersing machine "HELOS" (manufactured by SYMPATEC).

From the viewpoint of spent resistance, a coat carrier using silicon resin, copolymer resin of organopolysiloxane and vinyl monomer (graft resin) or polyester resin as a coating resin is used as a preferable carrier. Particularly, from the viewpoint of endurance, environment resistance stability and spent resistance, a coat carrier coated with resin obtained by reacting the copolymer resin of organopolysiloxane and vinyl monomer (graft resin) with isocyanate is preferably used. Vinyl monomer forming the above coat carrier is a monomer having a substituent such as a hydroxyl group or the like which has reactivity with isocyanate.

Next, the internal structure of the image forming apparatus 1 will be described. As shown in FIG. 1, the image forming apparatus 1 has an image reading unit 20, an image forming section 40 and suchlike.

The image reading unit 20 has a document feeder (not shown) and a document scanner (not shown). The document scanner contains an optical system and CCD (Charge Coupled Device), and the document scanner optically scans the surface of the document fed by the document feeder and generates and outputs an image signal (analog) by the CCD. The image signal output from the image reader 20 is subjected to an image processing by an image processor 15 described later, and is input to an image forming section 40.

The image signal input to the image forming section 40 comprises image digital data of five color components of CMYKG, and these image digital data are represented by image signals Cht, Mht, Yht, Kht and Ght, respectively.

The image forming section 40 has image forming units 40Y, 40M, 40C, 40G and 40K, an intermediate transfer belt 51, a cleaning unit 52, a secondary transfer roller 53, a fixing unit 60, a conveying unit 70, PFU (Paper Feeding Unit) 80, a stacker 90 and suchlike. The image forming units 40Y, 40M, 40C, 40G and 40K are image forming units for five colors of Y, M, C, G and K, and alphabets representing the colors are appended to the reference numerals. That is, the image forming units 40Y, 40M, 40C, 40G and 40K correspond to yellow, magenta, cyan, gray and black in this order. The same appending manner of alphabets is applied to other members of each color.

The image forming units 40Y, 40M, 40C, 40G and 40K form a tandem type image forming unit for forming toner images on the intermediate transfer belt 51. The image forming unit 40Y contains a photosensitive drum 41Y, a charging unit 42Y, an exposing unit 43Y, a developing unit 44Y, a primary transfer roller 45Y and a cleaning unit 46Y.

The photosensitive drum 41Y is a drum which is rotatably provided and rotates at a predetermined speed. The charging unit 42Y, the exposing unit 43Y, the exposing unit 44Y, the primary transfer roller 45Y and the cleaning unit 46Y are disposed around the photosensitive drum 41Y. The charging unit 42Y uniformly charges the peripheral surface of the photosensitive drum 41Y by a charging electrode. The exposing unit 43Y subjects the image signal Yht to a pulse width modulation by a laser driver to convert the image signal Yht to a pulse current, supplies this pulse current to a laser driving unit and outputs a laser beam to the photosensitive drum 41Y.

The photosensitive drum 41Y is scanned by a laser beam output from the exposing unit 43Y by using a polygonal scan unit (not shown) which is synchronized with the image signal Cht, wherein the laser beam is irradiated on the drum 41Y via lens system (not shown). In the photosensitive drum 41Y, the charging potential only at a site irradiated with the laser beam is extinguished, whereby an electrostatic image corresponding to the image signal Yht is formed on the photosensitive drum 41Y.

The developing unit 44Y is disposed in proximity to the photosensitive drum 41Y and develops a yellow toner image on the photosensitive drum 41Y. The yellow toner which is the high chroma toner and the carrier (not shown) are accommodated in the developing unit 44Y. In the developing unit 44Y, the yellow toner and the carrier are stirred by a screw (not shown) and uniformly mixed with each other. The stirred yellow toner and carrier get out/in from a metal roller (not shown) called as a developing sleeve to the outside of the developing unit 44Y, and are brought into contact with the photosensitive drum 41Y. At this time, the yellow toner adheres to only the site at which the charging potential of the photosensitive drum 41Y is extinguished (developed).

The primary transfer roller 45y transfers (primarily transfers) the yellow toner image developed on the photosensitive drum 41Y to the intermediate transfer belt 51. The cleaning unit 46Y removes the yellow toner remaining on the photosensitive drum 41Y after the primary transfer.

Likewise, the image forming unit 40M has a photosensitive drum 41M, a charging unit 42M, an exposing unit 43M, a developing unit 44M, a primary transfer roller 45M and a cleaning unit 46M. The image forming unit 40C has a photosensitive drum 41C, a charging unit 42C, an exposing unit 43C, a developing unit 44C, a primary transfer roller 45C and a cleaning unit 46C. The image forming unit 40G has a photosensitive drum 41G, a charging unit 42G, an exposing unit 43G, a developing unit 44G, a primary transfer roller 45G and a cleaning unit 46G. The image forming unit 40K has a photosensitive drum 41K, a charging unit 42K, an exposing unit 43K, a developing unit 44K, a primary transfer roller 45K and a cleaning unit 46K. Particularly, a gray toner, a black toner, a magenta toner of high chroma toners, and a cyan toner of high chroma toners are accommodated in the developing units 44G, 44K, 44M and 44C in this order.

The intermediate transfer belt 51 is an endless belt which is wound over and rotatably supported by a plurality of rollers, and moves in a rotational direction at fixed speed. Toner images of respective colors are transferred onto the intermediate transfer belt 51 by the image forming units 40Y, 40M, 40C, 40G and 40K. A yellow toner image, a magenta toner image, a cyan toner image, a gray toner image and a black toner image are superposed in this order on the intermediate transfer belt 51, thereby forming a color toner image.

The PFU 80 accommodates papers (transfer papers) therein and supplies the papers to the conveying unit 70. The conveying unit 70 sequentially conveys the papers supplied from the PFU 80 to the secondary transfer roller 53, the fixing unit 60 and the stacker 90 by a feeding roller (not shown). The secondary transfer roller 53 forms a nip portion between the secondary transfer roller 53 and the intermediate transfer belt 51, and transfers (secondarily transfer) a color toner image on the intermediate transfer belt 51 onto the paper conveyed from the PFU 80. The cleaning unit 52 removes toner remaining on the intermediate transfer belt 51 after the secondary transfer.

The fixing unit 60 heats and pressurizes the paper on which the color toner image is transferred by the secondary transfer roller 53 to fix (firmly fix) the toner image on the paper. The paper on which the toner image is fixed is conveyed to the stacker 90 by the conveying unit 70. The stacker 90 stocks the conveyed papers.

Figure 2:
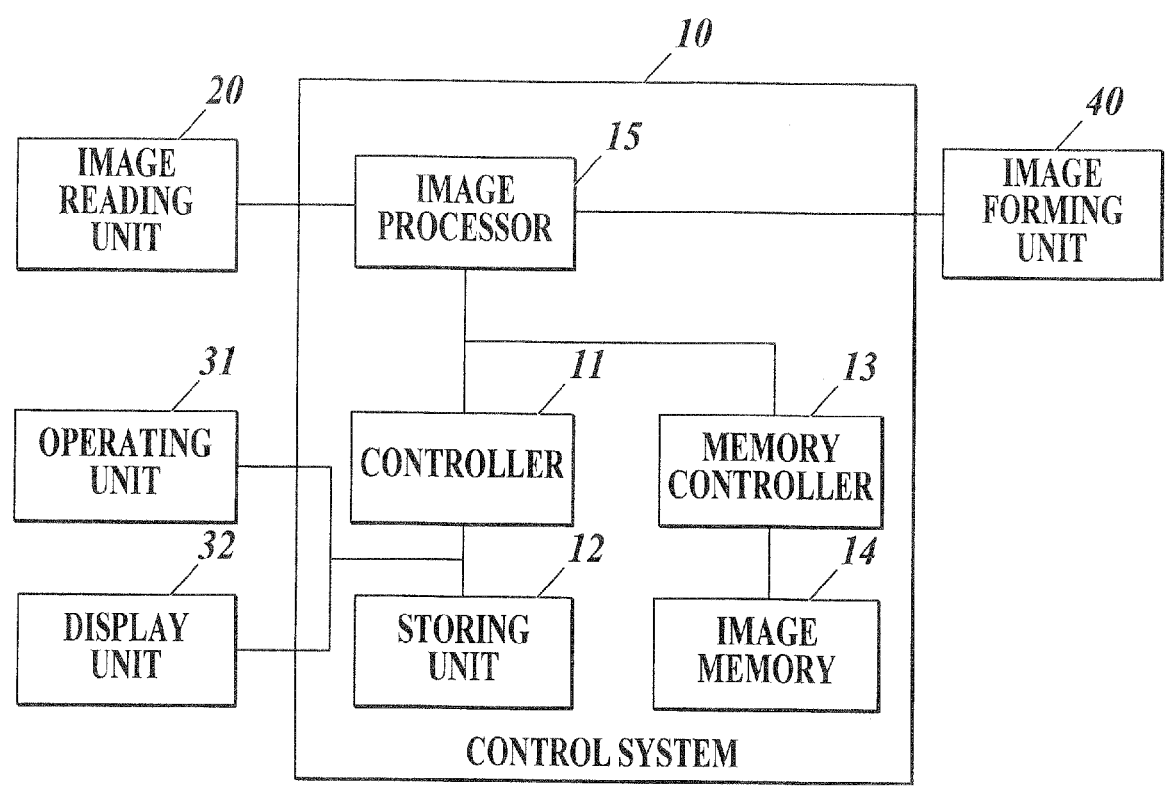
FIG. 2 is a block diagram showing a structure of the image forming apparatus.

Next, the functional structure of the image forming apparatus 1 will be described with reference to FIG. 2. FIG. 2 shows the functional structure of the image forming apparatus 1.

As shown in FIG. 2, the image forming apparatus 1 has a control system 10, an image reading unit 20, an operating unit 31, a display unit 32, an image forming section 40 and suchlike as a functional structure.

The operating unit 31 has a start key for instructing start of execution, numeric keys and the like, a touch panel and suchlike, and the operating unit 31 generates operating signals corresponding to these operations and outputs the operating signals to the controller 11. The display unit 32 displays various kinds of information such as various kinds of operation screens, execution results and suchlike on a display which is integrated with the touch panel of the operating unit 31.

The control system 10 has the controller 11, a storage unit 12, a memory controller 13, an image memory 14 and an image processor 15. The controller includes CPU (Central Processing Unit), RAM (Random Access Memory) and suchlike, and the control system 10 reads a program stored in the storage unit 12, expands the program in the RAM, and executes various kinds of processing such as control of the respective parts, calculation and suchlike in cooperation with the program in the RAM. For example, the controller 11 controls the image forming operation of the image forming section 40.

The storing unit 12 stores parameters and suchlike used to execute various kinds of programs and processing. The memory controller 13 controls input/output of an image into/from the image memory 14. The image memory 14 is a memory for storing image data, and DRAM (Dynamic RAM) or the like can be used for the image memory 14.

The image processor 15 subjects an image signal input from the image reading unit 20 to the image processing and outputs the processed image signal to the image forming section 40. The analog image signal generated by the image reading unit 20 is converted to digital data by an A/D converter (not shown), and then the digital data is input to the image processor 15. The image signal generated in the image reading unit 20 is an image signal which is decomposed into three color components of R (red), G (green) and B (blue). The image signals of these three color components are represented by image signals R, G and B.

The image processor 15 may be communicatively connected to an external equipment such as PC (Personal Computer) or the like through a communicating unit to receive image data for image formation from the external equipment, and the image processor 15 may subject this image data to various kinds of image processing and output the processed image data to the image forming section 40. The image signal input from the external equipment may be image signals of RGB or image signals of four color components of CMYK.

Figure 3:
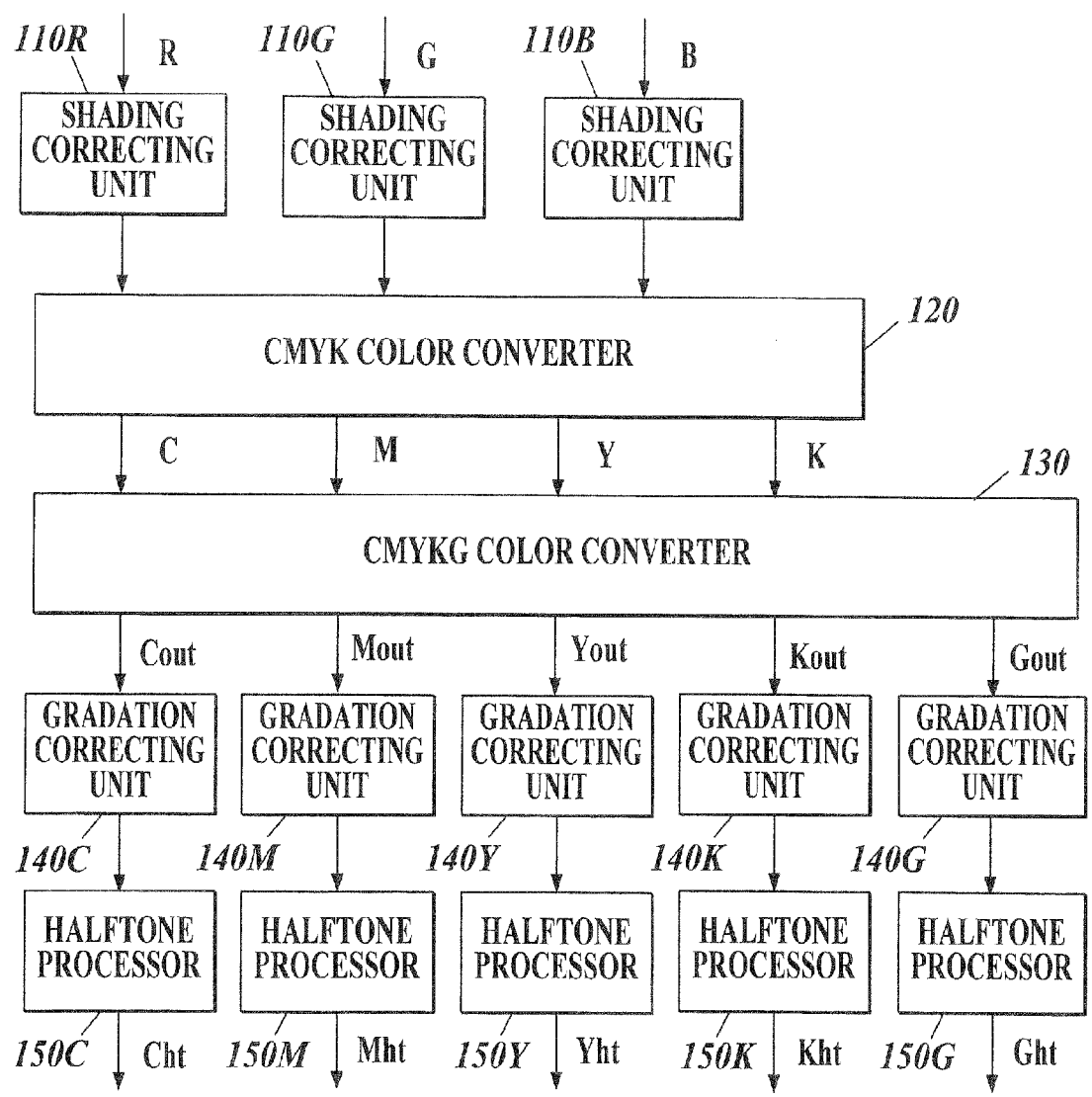
FIG. 3 is a block diagram showing a functional structure of an image processor.

Next, the main functional structure of the image processor 15 will be described with reference to FIG. 3. FIG. 3 shows the main functional structure of the image processor 15.

As shown in FIG. 3, the image processor 15 has shading correcting units 110R, 110G and 110B, a CMYK color converter 120, a CMYKG color converter 130, gradation correcting units 140C, 140M, 140Y, 140K, and 140G, halftone processors 150C, 150M, 150Y, 150K and 150G, and suchlike. The shading correcting units 110R, 110G and 110B are provided in connection with the three colors of RGB. The gradation correcting units 140C, 140M, 140Y, 140K and 140G, and the halftone processors 150C, 150M, 150Y, 150K and 150G are provided in connection with five colors of CMYKG, respectively.

The shading correcting units 110R, 110G and 110B subjects the image signals R, G and B input from the image reading unit 20 to processing of correcting unevenness of brightness occurring by the image reading unit 20. In addition, I-I' conversion processing of converting the brightness characteristic peculiar to CCD of the image reading unit 20 to a brightness characteristic optimum to human's visual sense characteristic, sharpening processing using an MTF (Modulation Transfer Function) filter or the like may be performed as occasion demands.

The CMYK color converter 120 executes color correction on the image signals R, G and B which have been subjected to the shading correction by the shading correcting units 110R, 110G and 110B and then executes color conversion to the image signals R, G and B to which the color correction have been executed, and thereby the CMYK color converter 120 generates and output image signals C, M, Y and K of four color components of CMYK. The CMYKG color converter 130 further executes color conversion on the image signals C, M, Y and K which are color-converted by the CMYK color converter 120, and thereby, the CMYKG color converter 130 generates and outputs image signals Cout, Mout, Yout, Kout and Gout of five color components of CMYKG. The image signals Cout, Mout, Yout, Kout and Gout are output to the gradation correcting units 140C, 140M, 140Y, 140K and 140G corresponding to the respective colors.

The gradation correcting units 140C, 140M, 140Y, 140K and 140G executes density gradation correction (γ correction) on the image signals Cout, Mout, Yout, Kout and Gout input from the CMYKG color converter 130 by using LUT (Look Up Table). The density gradation correction of the gradation correcting units 140C, 140M, 140Y, 140K and 140G is the processing of correcting the density gradation of an image in conformity with the visual sense characteristic, and the LUT is provided for the density gradation correction.

The halftone processors 150C, 150M, 150Y, 150K and 150G execute halftone processing on the image signals Cout, Mout, Yout, Kout and Gout input from the gradation correcting units 140C, 140M, 140Y, 140K and 140G to reproduce halftone and output the processing results as image signals Cht, Mht, Yht, Kht and Ght. As the halftone processing, any one of a screen cell method, an error diffusion method or the like may be adopted. The image signals Cht, Mht, Yht, Kht and Ght are input to the image forming section 40 (exposing units 43C, 43M, 43Y, 43K and 43G).

Furthermore, also when the image signal of RGB received from the external equipment is input to the image processor 15, the image signal of RGB is input to the shading correcting units 110R, 110G and 110B as image signals R, G and B as in the case of the foregoing operation. Furthermore, when the image signal of CMYK received from the external equipment is input to the image processor 15, the image signal of CMYK is subjected to the processing such as the shading correction and suchlike as the image signals C, M, Y and K, and then the processed image signals C, M, Y and K are input to the CMYKG color converter 130.

Figure 4:
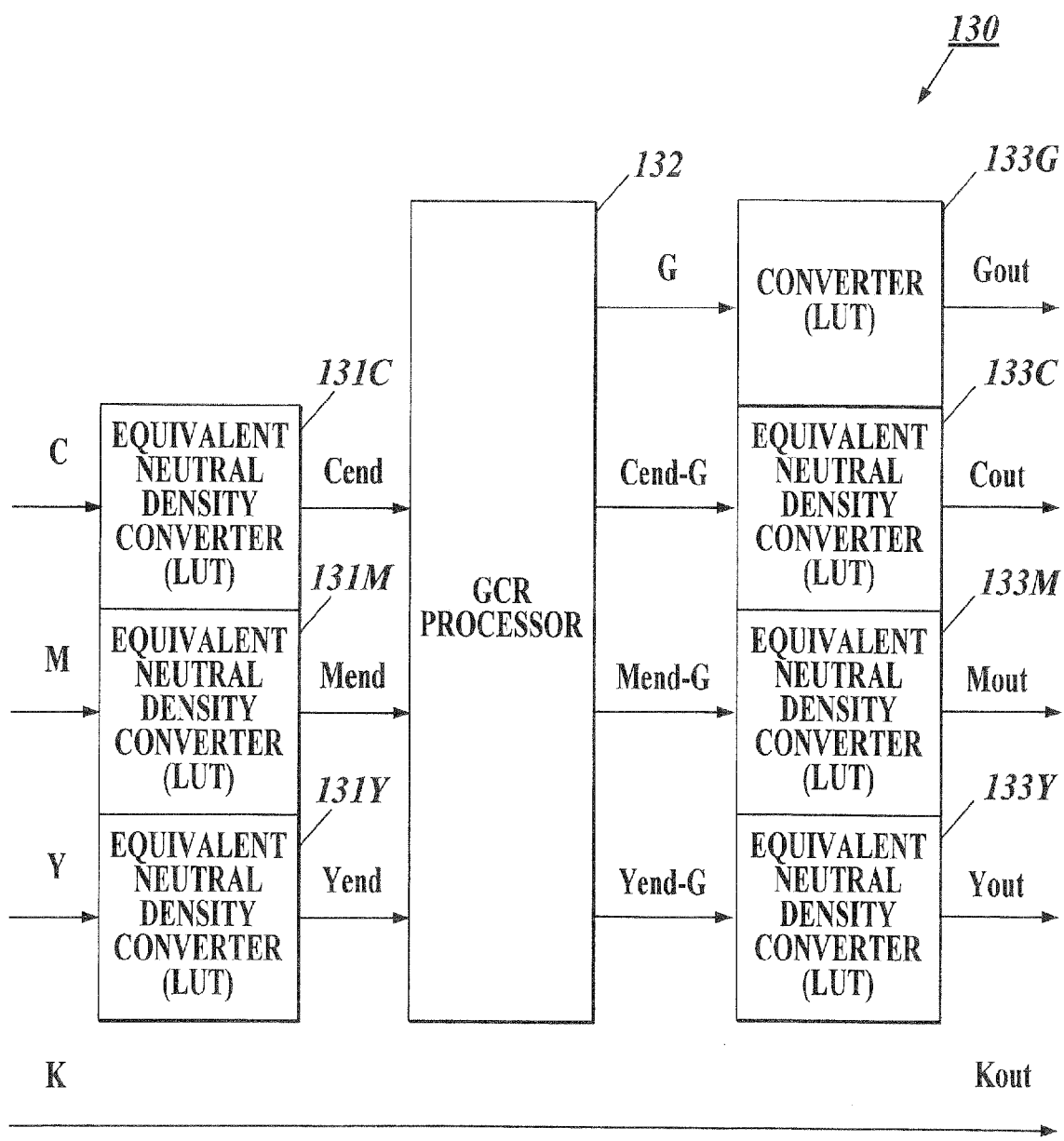
FIG. 4 is a block diagram showing a functional structure of a CMYKG color converter according to the embodiment.

Next, the functional structure of the CMYKG color converter 130 will be described with reference to FIG. 4. FIG. 4 shows the functional structure of the CMYKG color converter 130.

As shown in FIG. 4, the CMYKG color converter 130 has equivalent neutral density converters 131C, 131M and 131Y, a GCR (Gray Component Replacement) processor 132, equivalent neutral density inverse converters 133C, 133M and 133Y, and a converter 133G.

The equivalent neutral density converters 131C, 131M and 131Y convert the image signals C, M and Y input from the CMYK color converter 120 to equivalent neutral density components representing achromatic colors by using one-dimensional LUT, and output the equivalent neutral density components as image signals Cend, Mend and Yend. In other words, Cend=LUT(C), Mend=LUT(M) and Yend=LUT(Y) are calculated. The equivalent neutral density indicates neutral density (gray density) which can be generated by using color toners whose amount corresponds to the equivalent neutral density. For example, when the equivalent neutral density of C=0.8 is assumed to be Cend=1.5, gray whose density is equal to 1.5 can be made by using C of 0.8. However, in this case, it is assumed that M and Y can be used unlimitedly.

The GCR processor 132 executes GCR processing on the image signals Cend, Mend and Yend input from the equivalent neutral density converters 131C, 131M and 131Y. The GCR processor 132 first extracts the minimum values of the image signals Cend, Mend and Yend as a gray component G100 as the GCR processing. That is, G100=Min(C, M, Y) is calculated. Then, the GCR processor 132 multiplies G100 by a coefficient $\alpha$, and sets the multiplication result as an image signal G of a gray component to be reproduced with the gray toner. That is, G=G100*$\alpha$ is calculated. Here, the coefficient $\alpha$ is equal to a value from 0 to 1, and is a value which is favorable to a picture or an experience value with which gradation can be smoothly expressed. When $\alpha$ is equal to zero, it means that no gray toner is used. The image signal G100 means that the gray component is used at a maximum for $\alpha$=1. The GCR processor 132 subtracts the image signal G of the gray component from each of the image signals Cend, Mend and Yend, and outputs image signals Cend-G, Mend-G, Yend-G and G.

The equivalent neutral density inverse converters 133C, 133M and 133Y execute inverse conversion of the equivalent neutral density conversion on the image signals Cend-G, Mend-G, Yend-G and G input from the GCR processor 132 by using a one-dimensional LUT, and outputs the processing results as image signals Cout, Mout and Yout. In other words, Cout=LUT(Cend-G), Mout=LUT(Mend-G) and Yout-LUT (Yend-G) are calculated by using the LUT which leads the inverse conversion of the equivalent neutral density conversion.

Furthermore, the image signal G represents that the signal is the gray component calculated from the image signals Cend, Mend and Yend. The converter 133G converts the image signal G input from the GCR processor 132 to an image signal Gout for gray toner by using the LUT, and outputs the image signal Gout. Furthermore, the image signal K input to the CMYKG color converter 130 is passed without being processed, and is output as an image signal Kout (=K).

Figure 5A:
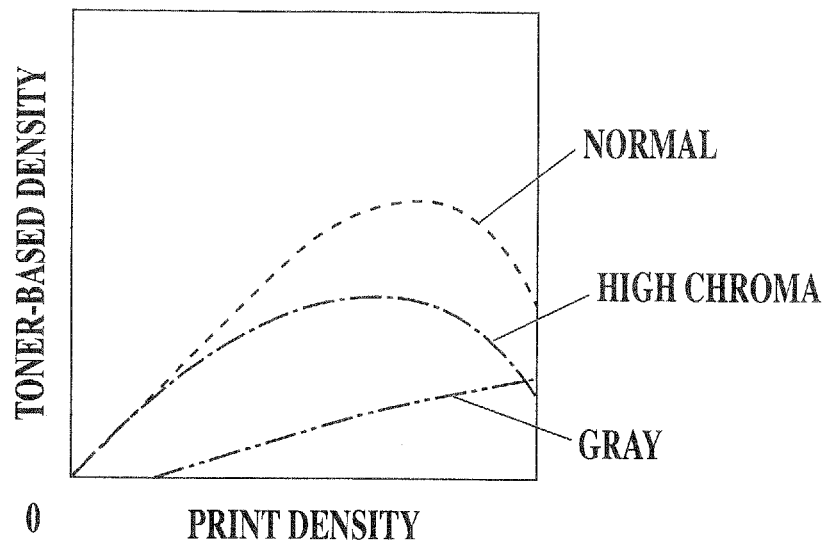
FIG. 5A is a diagram showing a toner-based density with respect to a print density for normal CMY toners, CMY toners of high chroma toners, and a gray toner.
Figure 5B:
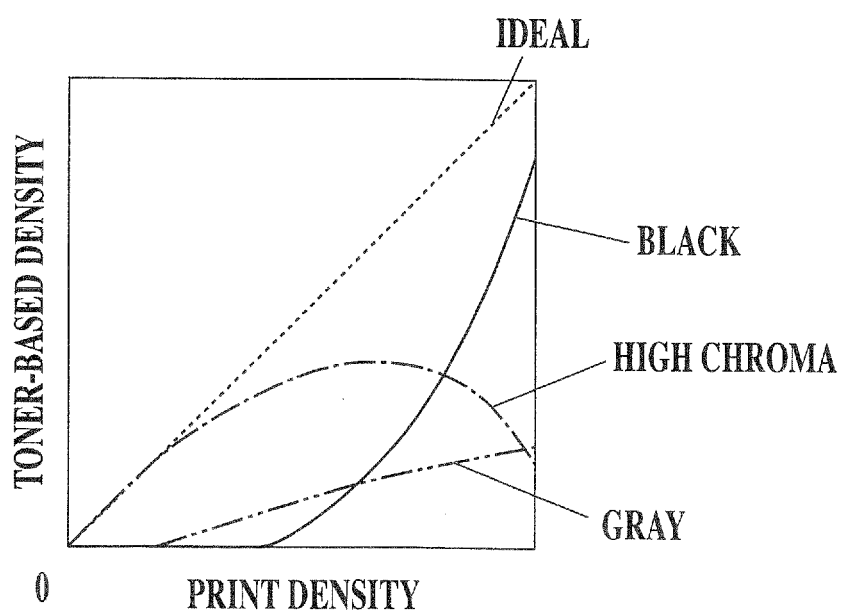
FIG. 5B is a diagram showing a toner-based density with respect to a print density for CMY toners of high chroma toners and a gray toner.

Next, the operation of the image forming apparatus 1 will be described. First, a way of using CMY toners, a black toner and a gray toner will be described with reference to FIGS. 5A and 5B. FIG. 5A shows a toner-based density with respect to a print density for normal CMY toners, CMY toners which are high chroma toners and a gray toner. FIG. 5B shows a toner-based density with respect to a print density for CMY toners which are high chroma toners, a black toner and a gray toner.

FIGS. 5A and 5B show color separation curves indicating how the CMY toners, the black toner and the gray toner should be used to reproduce an achromatic color density when using the normal CMY toners and when using the CMY toners which are high chroma toners. In FIG. 5A, a tone curve of the normal CMY toners is indicated by a broken line, a tone curve of the CMY toners which are high chroma toners is indicated by a one-dotted chain line, and a tone curve of the gray toner is indicated by a two-dotted chain line. In FIG. 5B, an ideal tone curve is indicated by a dashed line, a tone curve of the CMY toners which are high chroma toners is indicated by a one-dotted chain line, a tone curve of the black toner is indicated by a solid line, and a tone curve of the gray toner is indicated by a two-dotted chain line. The tone curve of CMY toners indicates an equivalent neutral density when an achromatic color is formed by superposing C, M and Y.

As shown in FIG. 5A, the CMY toners of the high chroma toners is lower in density than the normal CMY toners. Therefore, as shown in FIG. 5B, a black toner is normally used to increase the density. However, the black toner has relatively high granularity, and a gray toner itself has low granularity. At this time, in order to obtain a sufficient density, the gray toner is mainly used in the low density region and the black toner is mainly used in the high density region, whereby the granularity in a low-middle density region can be reduced. Further, a part of the CMY toners of the high chroma toners used to form an image of an achromatic color is set to a gray toner. The CMYKG color converter 130 converts the image signals C, M, Y and K to the image signals Cout, Mout, Yout, Kout and Gout so as to establish the color separation as described above.

As described above, in the image forming apparatus 1, the image signals input from the image reading unit 20 or the external equipment are subjected to the shading correction by the image processor 15, are converted from the image signals C, M, Y and K to the image signals Cout, Mout, Yout, Kout and Gout and are subjected to the gradation correction and the halftone processing to be converted to the image signals Cht, Mht, Yht, Kht and Ght. Then, in accordance with the image signals Cht, Mht, Yht, Kht and Ght, a color toner image is formed on the intermediate transfer belt 51 with a yellow toner, a magenta toner, a cyan toner, a black toner and a gray toner by the image forming units 40Y, 40M, 40C, 40K and 40G. The paper supplied from the PFU 80 is conveyed by the conveying unit 70. The color toner image formed on the intermediate transfer belt 51 is transferred onto the paper by the secondary transfer roller 53, and is fixed by the fixing unit 60. This paper is discharged to the stacker 90.

As described above, according to this embodiment, in the image forming apparatus 1, the image processor 15 converts the CMY components of the image signals of CMYK which are input from the image reading unit 20 or the external equipment and converted to equivalent neutral density components, calculates a gray component from the converted CMY components of equivalent neutral density, subtracts the gray component from each of the respective components of cyan, magenta and yellow of equivalent neutral density, executes inverse conversion of the equivalent neutral density conversion on the respective subtracted components of CMY of equivalent neutral density, and outputs them as the image signals Cht, Mht, Yht, Kht and Ght of CMYKG. The image forming section 40 forms an image in accordance with the image signals Cht, Mht, Yht, Kht and Ght by using a cyan toner, a magenta toner and a yellow toner of high chroma toners, a black toner and a gray toner. That is, the density of an achromatic color which can be expressed by normal CMY toner is expressed by using CMY toners of high chroma toners and a gray toner, whereby the high chroma toners can be used without changing the image signal K.

Therefore, when a toner set of high chroma toners is used, a problem that the start point of introducing the black toner needs to be set at a low density can be solved. That is, in the image formation using the high chroma toners, granularity can be enhanced by using the gray toner having lower granularity than the black toner. Further, the density can be enhanced by replacing the CMT toners with the gray toner to form an image of an achromatic color, whereby the total toner amount can be reduced without deteriorating the image quality.

Furthermore, the image signal K among the original image signals C, M, Y and K can be output as it is, and thus the source GCR setting (the setting in which only the K (ink) is not changed in color reproduction of CMYK→CMYK) can be performed. Furthermore, a color conversion circuit system can be basically configured to be added at the rear stage of a four-color conversion circuit, and thus the conventional, system can be frequently diverted. Still furthermore, the conversion LUT data (color profile) of color signals in the color conversion circuit can be created by using a conventional four-color profile creating software or the like.

(First Modification)

Figure 6:
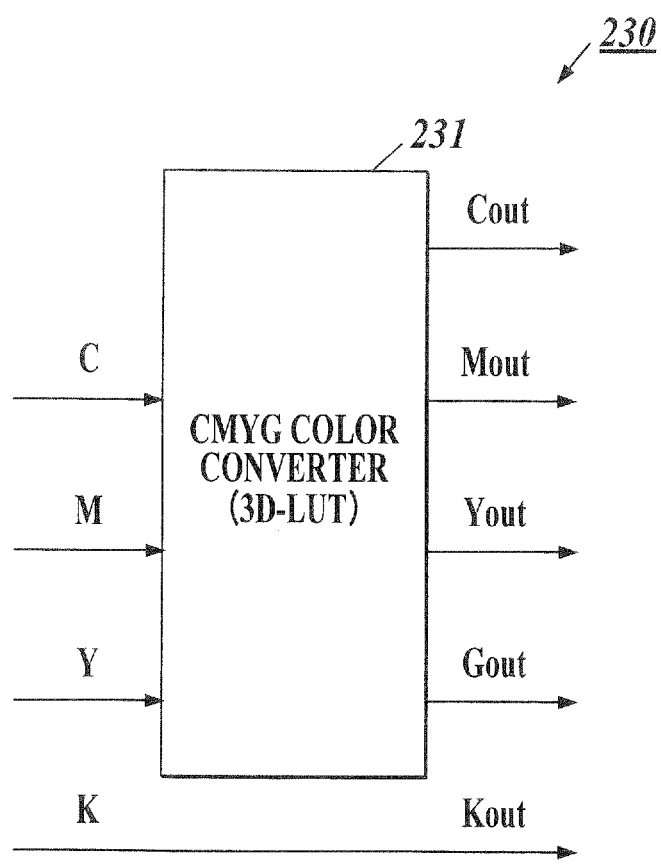
FIG. 6 is a block diagram showing a CMYKG color converter according to a first modification of the embodiment.

A first modification of the above embodiment will be described with reference to FIG. 6. FIG. 6 shows a CMYKG color converter 230 of this modification.

According to the structure of the apparatus of this modification, in the image forming apparatus 1 of the above embodiment, the CMYKG color converter 230 shown in FIG. 6 may be provided in place of the CMYKG color converter 130.

The CMYKG color converter 230 has a CMYG color converter 231. Each of the equivalent neutral density converter 131C and the like of the CMYKG color converter 130 of the above embodiment converts an image signal by using the one-dimensional LUT. On the other hand, the CMYG color converter 231 converts the image signals C, M, Y and K to the image signals Cout, Mout, Yout, Kout and Gout in a lump by using a three-dimensional (3D) LUT. The three-dimensional LUT is one LUT for performing the same conversion processing as all of the processing of the equivalent neutral density converters 131C, 131M and 131Y, the GCR processor 132, the equivalent neutral density inverse converters 133C, 133M and 133Y and the converter 133G.

According to this modification, the image forming apparatus has the CMYKG color converter 230 in place of the CMYKG color converter 130. Therefore, the same advantage as the image forming apparatus 1 according to the above embodiment can be obtained, and the device structure in the image processor 15 can be simplified.

(Second Modification)

Figure 7:
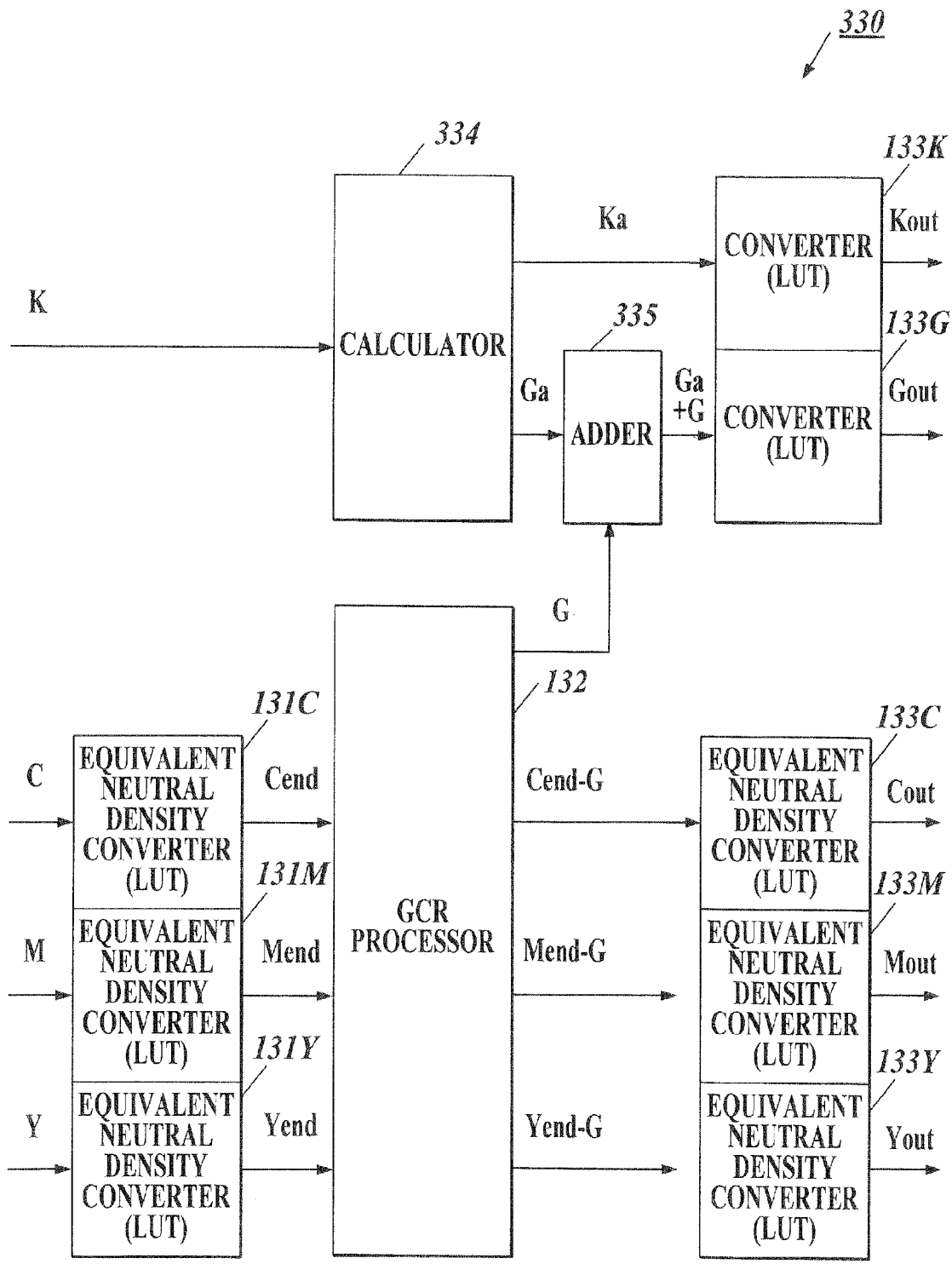
FIG. 7 is a block diagram showing a CMYKG color converter according to a second modification of the embodiment.

A second modification of the above embodiment will be described with reference to FIGS. 7, 8A and 8B. FIG. 7 shows a CMYKG color converter 330 of this modification.

According to the structure of the apparatus of this modification, in the image forming apparatus 1 according to the above embodiment, the CMYKG color converter 330 shown in FIG. 7 may be provided in place of the CMYKG color converter 130.

The CMYKG color converter 330 is obtained by combining the constituent elements of the CMYKG color converter 130 with a structure of separating the K color to K color+gray color. As shown in FIG. 7, the CMYKG color converter 330 has equivalent neutral density converters 131C, 131M and 131Y, a GCR processor 132, equivalent neutral density inverse converters 133C, 133M and 133Y, an calculator 334, an adder 335 and converters 133G and 133K.

The calculator 334 converts a part of the input image signal K to a gray component to replace the input image signal K with the image signal Ka of the black component after the conversion and the image signal Ga of the gray component, and outputs the replaced image signals Ka and Ga. The adder 335 adds the image signal G input from the GCR processor 132 and the image signal Ga input from the calculator 334, and outputs the sum of the signals as an image signal (Ga+G).

The converter 133K converts the image signal Ka input from the calculator 334 to the image signal Kout for black toner by using the one-dimensional LUT and outputs the converted image signal Kout. The converter 133G converts the image signal Ga+G input from the adder 335 to the image signal Gout for gray toner by using the one-dimensional LUT and outputs the converted image signal Gout.

Here, the replacement from the image signal K to the image signals Ka and G will be described with reference to FIGS. 8A and 8E. FIG. 8A shows a toner-based density with respect to a print density for the gray toner and the black toner before and after the replacement. FIG. 8B shows a toner-based density with respect to a print density for CMY toners of high chroma toners, gray toner and black toner after the replacement.

Figure 8A:
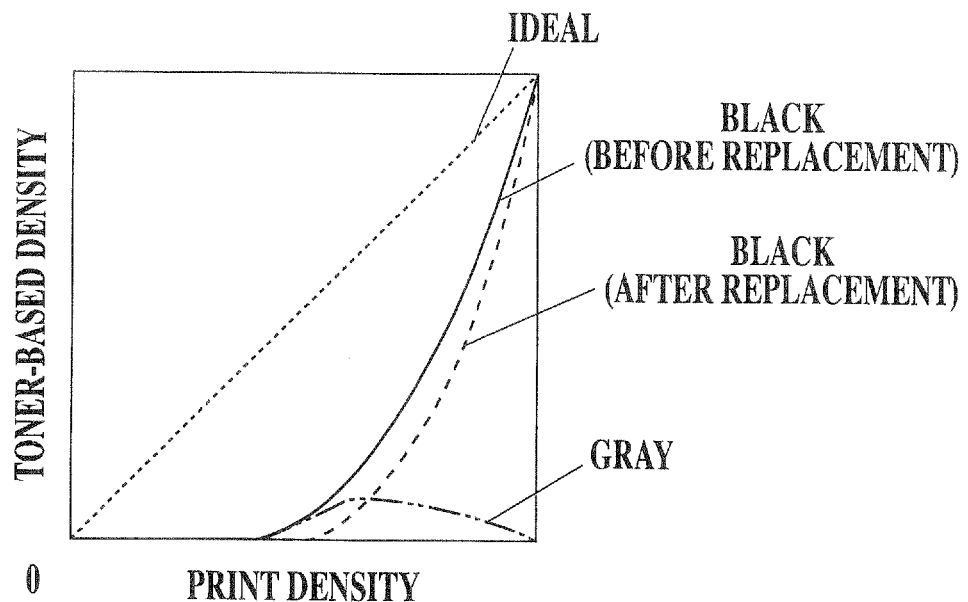
FIG. 8A is a diagram showing a toner-based density with respect to a print density for a gray toner and a black toner before and after replacement.
Figure 8B:
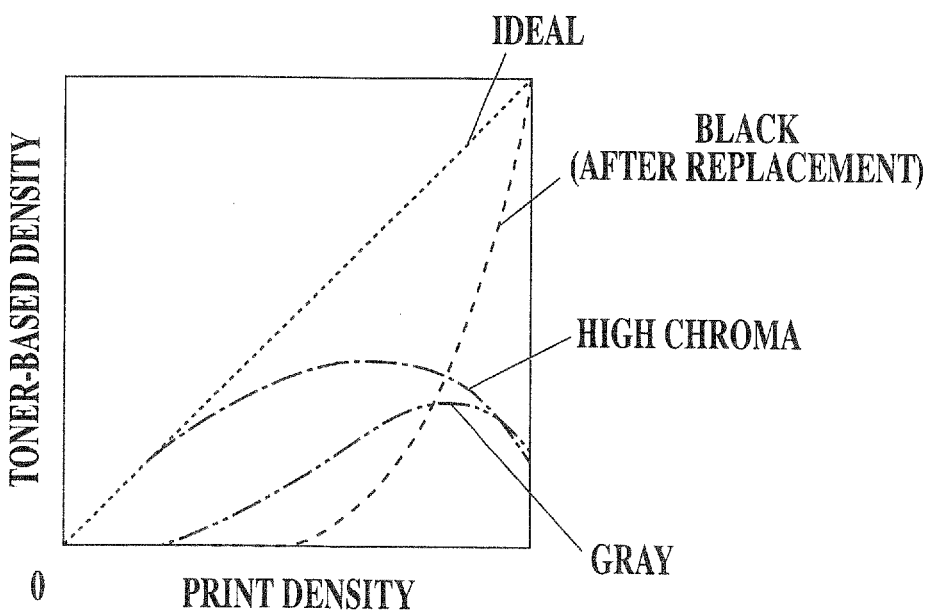
FIG. 8B is a diagram showing a toner-based density with respect to a print density for CMY toners of high, chroma toners, a gray toner and a black toner after replacement.

FIGS. 8A and 8B show color separation curves indicating how the CMY toners, the black toner and the gray toner should be used to reproduce an achromatic color density. In FIG. 8A, an ideal tone curve is indicated by a dashed line, a tone curve of the black toner before the replacement is indicated by a solid line, a tone curve of the black toner after the replacement is indicated by a broken line, and a tone curve of the gray toner is indicated by a two-dotted chain line. Furthermore, in FIG. 8B, an ideal tone curve is indicated by a dashed line, a tone curve of the CMY toners of high chroma toners is indicated by a one-dotted chain line, a tone curve of the black toner after the replacement is indicated by a broken line, and a tone curve of the gray toner is indicated by a two-dotted chain line. The tone curve of the CMY toners indicates the equivalent neutral density when C, M and Y are superposed to form an achromatic color.

As shown in FIG. 8A, a part of the black toner is replaced with a gray component, whereby the tone curve of the black toner can be shifted to a high density side in the drawing. The calculator 334 executes the replacement processing of the image signal K to the image signals Ka and Ga so that the tone curve of black toner shifts to the high density side in the drawing.

FIG. 8B shows the color separation curve when the partial replacement of the CMY toners of high chroma toners with gray and the partial replacement of the black toner with gray are combined with each other. The CMYKG color converter 330 executes the conversion processing of executing the two replacements as described above. By using the gray toner more positively, the high chroma toners can be handled and the start point of the tone curve of the black toner (the ink-in start point) can be moved to the high density side in the drawing, thereby an image with improved granularity can be obtained.

As described above, according to this modification, the image forming apparatus has the CMYKG color converter 330 in place of the CMYKG color converter 130. The CMYKG color converter 330 converts the CMY components of the input image signals of CMYK to the components of CMYG, calculates a gray component from the black component of the input image signals of CMYK to replace the black component with the black component and the gray component, and adds the calculated gray component and the gray component converted from the components of CMY to generate image signals Cout, Mout, Yout, Kout and Gout of CMYKG.

Therefore, the same advantage as the image forming apparatus 1 according to the above embodiment can be achieved, and also, by replacing a part of the image signal K with a gray component, the use area of the black toner can be shifted to the high density side in FIGS. 8A and 8B, whereby the granularity can be more enhanced.

(Third Modification)

Figure 9:
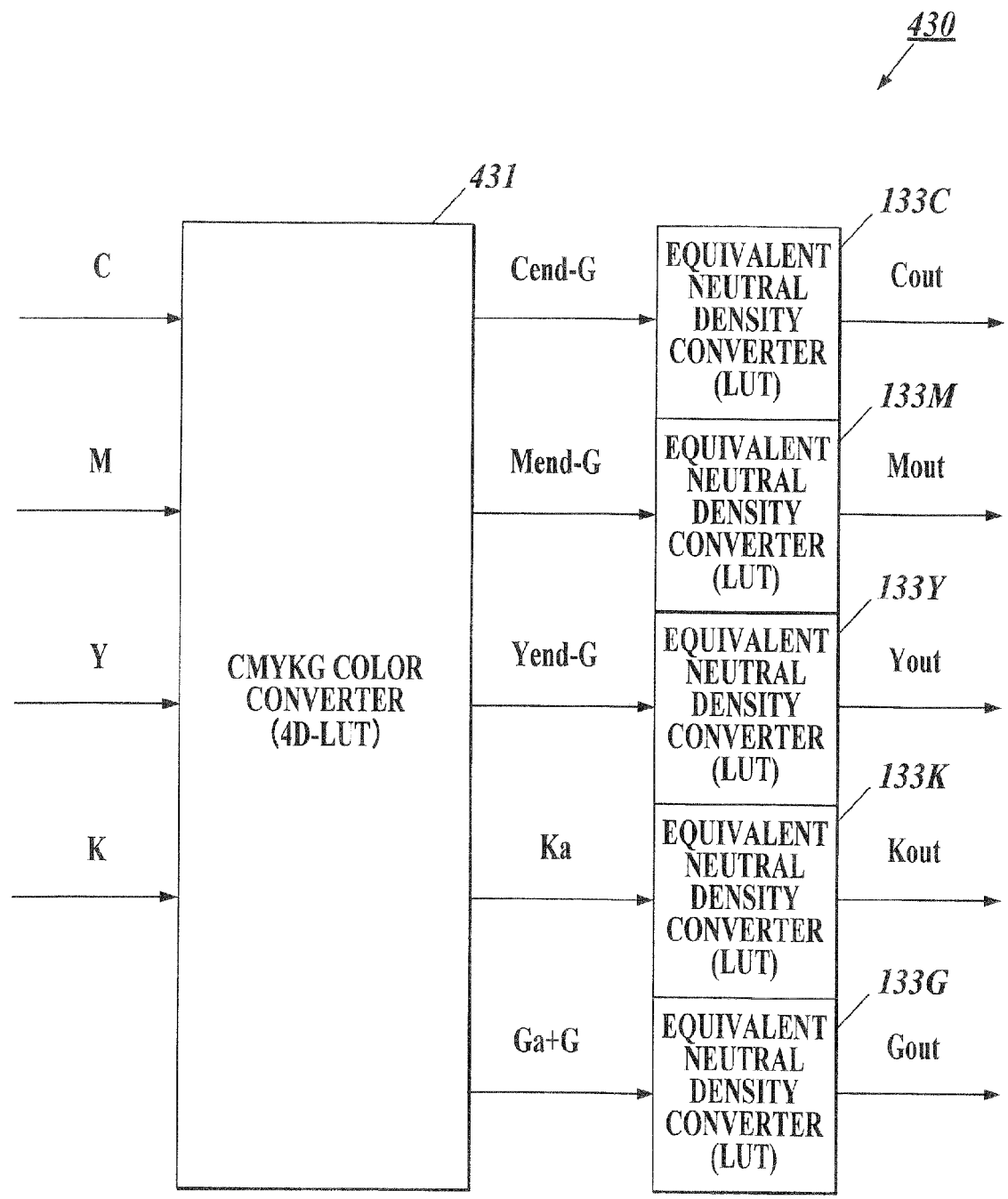
FIG. 9 is a block diagram showing a CMYKG color converter according to a third modification of the embodiment.

A third modification according to the above embodiment will be described with reference to FIG. 9. FIG. 9 shows a CMYKG color converter 430 according to this modification.

The apparatus of this modification is constructed so as to have a CMYKG color converter 430 shown in FIG. 9 in place of the CMYKG color converter 330 in the image forming apparatus 1 of the second modification.

The CMYKG color converter 430 has a CMYKG color converter 431, equivalent neutral density inverse converters 133C, 133M and 133Y, and converters 133K and 133G. The CMYKG color converter 431 converts the image signals C, M, Y and K to the image signals Cend-G, Mend-G, Yend-G, Ka and Ga in a lump by using the four-dimensional (4D) LUT. This four-dimensional LUT is one LUT for performing the same conversion processing as all of the processing of the equivalent neutral density converters 131C, 131M and 131Y, the GCR processor 132, the calculator 334 and the adder 335. The four-dimensional LUT may be one LUT for performing the same conversion processing as all of the processing of the equivalent neutral density converters 131C, 131M and 131Y, the GCR processor 132, the equivalent neutral density concentration inverse converters 133C, 133M and 133Y, the calculator 334, the adder 335 and the converters 133G and 133K.

As described above, according to this embodiment, the image forming apparatus has the CMYKG color converter 430 in place of the CMYKG color converter 130. Therefore, the same advantage as the image forming apparatus of the second modification can be obtained, and the apparatus structure in the image processor 15 can be simplified.

Example 1

Here, a result obtained by actually performing image formation using high chroma toners in the image forming apparatus 1 of the above embodiment will be described. As shown in the following table 2, an image was formed on paper by the image forming apparatus 1 wherein the High chroma toners of high chroma toners, gray toner having the brightness described with reference to the above embodiment and black toner were combined with one another. The chroma indicates the maximum chroma of a toner image, and the brightness represents the brightness of the toner image having the maximum chroma.

TABLE 2

| Y TONER | COLORING AGENT A | COLORING AGENT B | MASS RATIO (A/B) | ADDITION AMOUNT | COLOR SATURATION | BRIGHTNESS |
|---|---|---|---|---|---|---|
| Y-1 | PY65 | PY36 | 95/5 | 5 PARTS | 89 | 73 |
| Y-2 | PY74 | PY139 | 90/10 | 5 PARTS | 104 | 88 |
| Y-3 | PY74 | PY36 | 80/20 | 5 PARTS | 101 | 82 |

| M TONER | COLORING AGENT | ADDITION AMOUNT | COLOR SATURATION | BRIGHTNESS |
|---|---|---|---|---|
| M-1 | CHELATE | 7 PARTS | 84 | 50 |
| M-2 | RHODAMINE DYE | 7 PARTS | 78 | 51 |
| M-3 | RHODAMINE DYE | 7 PARTS | 74 | 46 |

| C TONER | COLORING AGENT A (DARK) | COLORING AGENT B (LIGHT) | MASS RATIO (A/B) | ADDITION AMOUNT | COLOR SATURATION | BRIGHTNESS |
|---|---|---|---|---|---|---|
| C-1 | — | SiPc | 95/5 | 5 PARTS | 63 | 64 |
| C-2 | PY74 | SiPc | 10/90 | 5 PARTS | 62 | 63 |
| C-3 | — | CuPc DYE | 0/100 | 5 PARTS | 59 | 60 |

| G TONER | COLORING AGENT | ADDITION AMOUNT | COLOR SATURATION | BRIGHTNESS |
|---|---|---|---|---|
| G-1 | C.B. | 1 PART | 2 | 75 |
| G-2 | C.B. | 2 PARTS | 3 | 55 |
| G-3 | C.B. | 3 PARTS | 3 | 42 |
| G-4 | C.B. | 0.2 PART | 1 | 92 |
| G-5 | C.B. | 6 PARTS | 4 | 27 |

More specifically, yellow toners Y-1, Y-2 and Y-3 were used as the yellow toner of high chroma toner. Magenta toners M-1, M-2 and M-3 were used as the magenta toner of high chroma toner. Cyan toners C-1, C-2 and C-3 were used as the cyan toner of high chroma toners. Gray toners G-1, G-2 and G-3 having the brightness described with reference to the above embodiment and gray toners G-4 and G-5 whose brightness is out of the above range were used as the gray toner. Normal black toner was used as the black toner.

As shown in the following table 3, evaluation of granularity of flesh color, evaluation of granularity of sky blue and evaluation of a total toner amount in a formed image were performed. In this case, the image formation was formed on the basis of the following toner combinations excluding black toner: image formation example (1) of (Y-1, M-1, C-1, G-1), image formation example (2) of (Y-2, M-2, C-2,G-2), image formation example (3) of (Y-3, M-3, C-3, G-3), image formation example (4) of (Y-1, M-1, C-1, G-4), image formation example (5) of (Y-2, M-2, C-2, G-5), and image formation example (6) of (Y-3, M-3, C-3, no gray).

TABLE 3

| IMAGE FORMATION EXAMPLE | G TONER | Y TONER | M TONER | C TONER | GRANULARITY FLESH COLOR SITE | BLUE SKY SITE | TOTAL TONER AMOUNT ESTIMATION/ IMAGE ESTIMATION YMC TOTAL | G | DETERMINATION |
|---|---|---|---|---|---|---|---|---|---|
| EXAMPLE (1) | G-1 | Y-1 | M-1 | C-1 | A | A | 82 | 81 | ○ |
| EXAMPLE (2) | G-2 | Y-2 | M-2 | C-2 | A | B | 81 | 60 | ○ |
| EXAMPLE (3) | G-3 | Y-3 | M-3 | C-3 | B | C | 85 | 55 | ○ |
| EXAMPLE (4) | G-4 | Y-1 | M-1 | C-1 | A | A | 82 | 90 | X |
| EXAMPLE (5) | G-5 | Y-2 | M-2 | C-2 | D | D | 80 | 32 | ○ |
| EXAMPLE (6) | — | Y-3 | M-3 | C-3 | D | D | 85 | — | — |

First, a method of evaluating the granularity of flesh color will be described.

The flesh color is defined as a color represented in the brightness range from 70 to 130 and the hue range from 70 to 100, and is set to five flesh colors within the Web Safe Color. In the image forming apparatus 1, a patch image of "#ffffcc, #ffff99, #ffff66, #ffcc99, #ffcc66" was output onto a paper in a printer mode, and the granularities thereof were comprehensively determined. The evaluation was performed on the basis of the following evaluation criteria A to D.

A; an image looks finely textured through even a loupe (magnification: ten times), and an uniform halftone image is reproduced.

B; although it cannot be identified by naked eye, an image is subjected to slight roughness caused by granularity when observed through a loupe.

C; roughness caused by granularity is observed by naked eye, however, it can be permitted as an image.

D; roughness caused by granularity is severe and an image looks rough.

As shown in the table 3, with respect to the granularity of flesh color after the image formation, good results were obtained for the image formation examples (1), (2), (3) and (4).

Next, a method of evaluating the granularity of sly blue will be described. The color of sky blue is a color represented in the brightness range from 70 to 100 and the hue range from 180 to 300, and is set to five sky blue colors within the Web Safe Color. In the image forming apparatus 1, a patch image of "#99ccff, #99ffff, #99cccc, #ccccff, #ccffff" was output onto a paper in a printer mode, and the granularities thereof were comprehensively determined. The evaluation was performed on the basis of the above evaluation criteria A to D.

As shown in the table 3, with respect to the granularity of sky blue after the image formation, good results were obtained for the image formation examples (1), (2), (3) and (4).

Next, a method of evaluating the total toner amount will be described with reference to FIG. 10.

Figure 10:
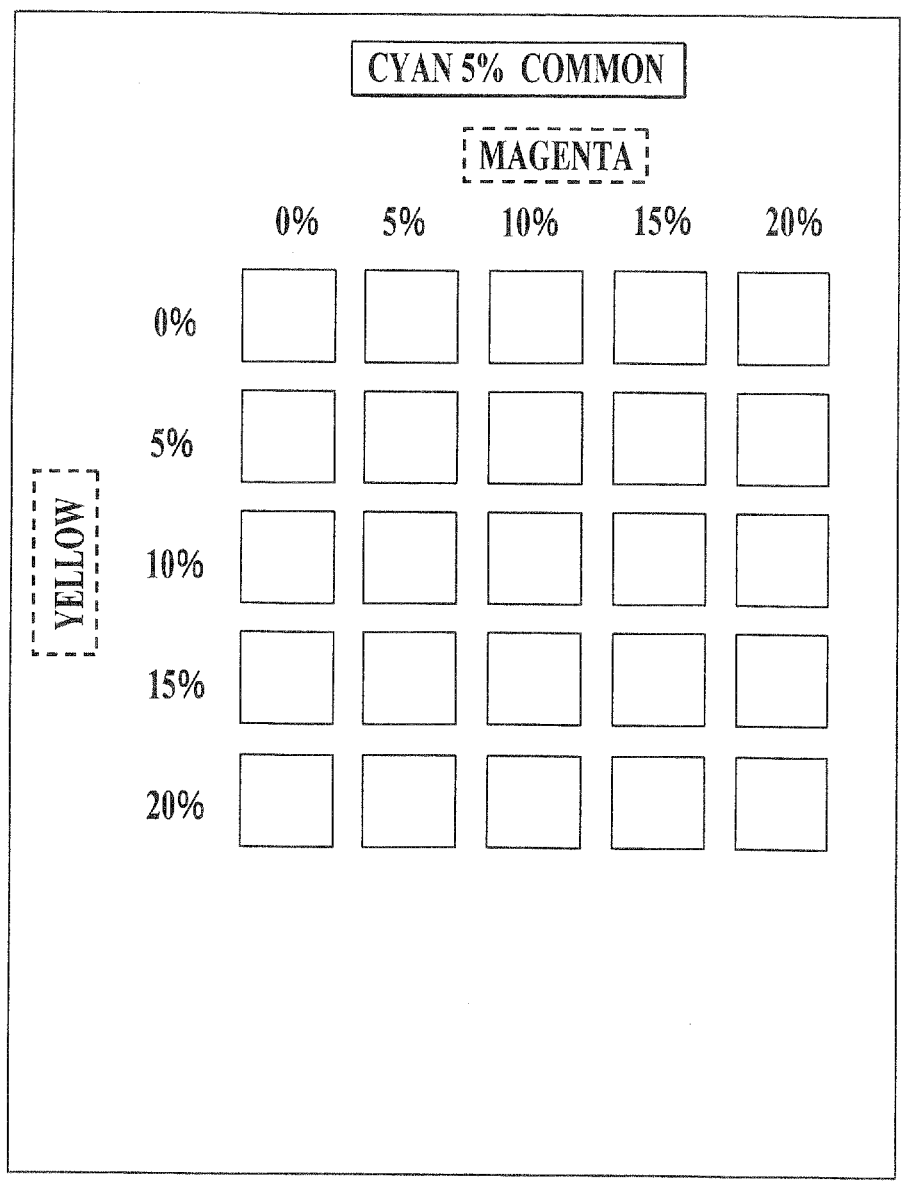
FIG. 10 is a diagram showing an example of patches in which a yellow toner, a magenta toner and a cyan toner are superimposed.
Figure 11A:
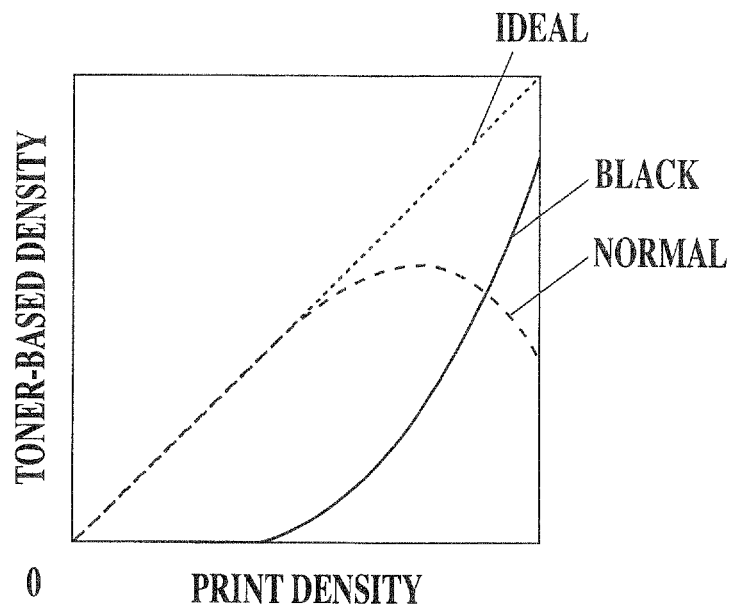
FIG. 11A is a diagram showing a toner-based density with respect to a print density for normal CMY toners and a black toner.
Figure 11B:
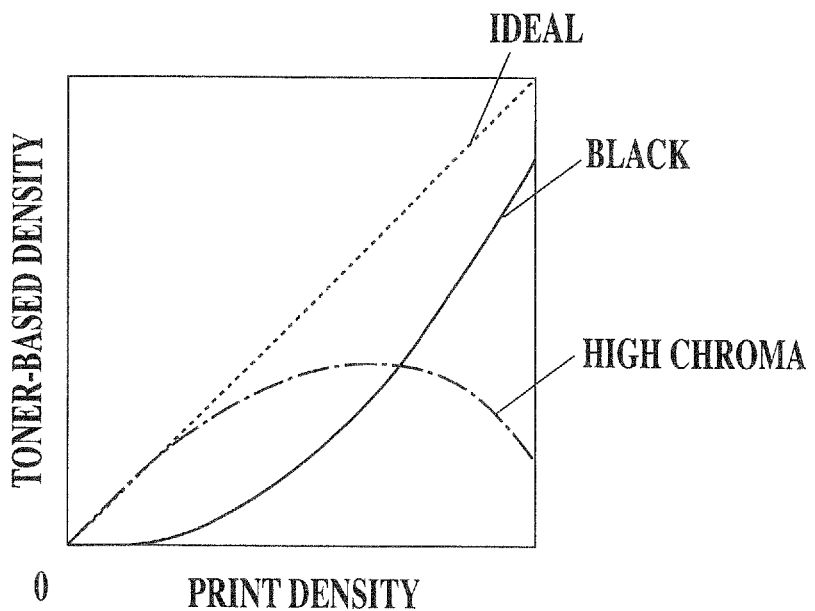
FIG. 11B is a diagram showing a toner-based density with respect to a print density for CMY toners of high chroma toners and a black toner.

FIG. 10 shows an example of a patch in which the yellow toner, the magenta toner and the cyan toner are superposed.

First, an image signal value at which the toner adhering amount on paper is equal to 4.0 g/m² is set to 100% for each of the yellow toner, the magenta toner, the cyan toner and the gray toner.

Patches of 2 cm×2 cm are formed on a POD 128 gloss coat paper manufactured by Oji Paper Co., Ltd wherein the image signal value of the gray toner is varied from 0% to 100% in a 10% interval, and the brightness is measured for each patch. A graph in which the horizontal axis represents the image signal value and the vertical axis represents the brightness is created by using this data, and an image signal value of the gray toner which has the brightness of 70 is read out.

As shown in FIG. 10, patches of 2 cm×2 cm are arranged in five by five in vertical and horizontal directions, wherein all of the image signal values for the cyan toner are set to 5%; the image signal values for the magenta toner are successively set to 0% in a first column, 5% in a second column, 10% in a third column, 15% in a fourth column and 20% in a fifth column in the vertical direction from the leftmost column; and the image signal values for the yellow toner are successively set to 0% in a first line, 5% in a second line, 10% in a third line, 15% in a fourth line and 20% in a fifth line in the horizontal direction from the uppermost side line.

Furthermore, for each of the image signal values of 10%, 15% and 20% of the cyan toner, patches of 2 cm×2 cm are likewise arranged in five by five in the vertical and horizontal directions.

The chromaticity of these three-color superposed patches was measured, and achromatic color patches whose chroma equal to 10 or less were extracted. A graph in which the horizontal axis represents the total of the image signal values of yellow toner, magenta toner and cyan toner and the vertical axis represents the brightness was created by using the data of the extracted achromatic color patches.

The total of image signal values of yellow toner, magenta toner and cyan toner having brightness of 70 was read out from the graph.

The read-out image signal values having the brightness of 70 were compared with one another. When the image signal value of a gray toner is smaller than the total of the image signal values of a yellow toner, a magenta toner and a cyan toner, the toner adhering amount required to obtain an achromatic color image having the brightness of 70 can be reduced by using the gray toner, and thus it is determined as an excellent gray toner which can suppress the total toner amount ("○" in table 3).

Conversely, when the image signal value of a gray toner is larger than the total of the image signal values of yellow toner, magenta toner and cyan toner, use of the gray toner causes the toner adhering amount required to obtain an achromatic color image having the brightness of 70 ti increase, and thus it is determined as gray toner which has no suppressing advantage of the total toner amount ("x" in table 3).

The chromaticity of the patchs were measured by using the spectrophotometer "Gretag Macbeth Spectrolino" (manufactured by Gretag Macbeth company). With respect to a measurement condition, a D65 light source was used as a light source, a reflection measurement aperture of φ4 mm was adopted as a reflection measurement aperture, a measurement wavelength region from 380 to 730 nm was measured at an interval of 10 nm, a view angle (observer) was set to 2°, and a dedicated white tile is used for reference matching.

Accordingly, from the table 3, in consideration of the granularity and the total toner amount, a result that the image forming examples (1), (2) and (3) are preferable was obtained.

The descriptions of the above embodiment and the modifications relate to an example of the preferable image forming apparatus and image forming method according to the present invention, and the present invention is not limited to them.

For example, according to the above embodiment, an image is formed by using the High chroma toners of high chroma toners, the normal black toner and the gray toner. However, the present invention is not limited to this embodiment. For example, an image forming apparatus may be designed to form an image by using CMY toners of high chroma toners, a normal yellow toner and a black toner, and a gray toner. According to this image forming apparatus, the same advantage as the image forming apparatuses 1 of the above embodiment and each modification can be obtained.

Furthermore, the detailed structure of each part constituting the image forming apparatus and the detailed operation thereof in the above embodiment and the modifications can be suitably modified within the scope of the subject matter of the present invention.

This U.S. patent application claims a priority based on Paris Convention for Japanese Patent Application No. 2010-044820 filed on Mar. 2, 2010, and is based on the Japanese Patent Application concerned for correction of erroneous translation of the U.S. patent application and hereby incorporates by reference the Japanese Priority Application.

What is claimed is:

1. An image forming apparatus comprising:
a color converter for
converting a cyan component, a magenta component and a yellow component of a first image signal comprising the cyan component, the magenta component, the yellow component and a first black component to equivalent neutral density,
calculating a first gray component from an equivalent neutral density cyan component, an equivalent neutral density magenta component and an equivalent neutral density yellow component,
subtracting the first gray component from each of the equivalent neutral density cyan component, the equivalent neutral density magenta component and the equivalent neutral density yellow component,
subjecting each of the equivalent neutral density cyan component, the equivalent neutral density magenta component and the equivalent neutral density yellow component from which the first gray component is subtracted to an inverse conversion of a conversion to the equivalent neutral density, and
outputting a second image signal comprising a cyan component, a magenta component and a yellow component which are obtained by carrying out the inverse conversion to the equivalent neutral density cyan component, the equivalent neutral density magenta component and the equivalent neutral density yellow component from which the first gray component is subtracted, the first black component and the first gray component;
an image forming section for forming an image on a paper based on the second image signal by using a cyan toner, a magenta toner, a yellow toner, a black toner and a gray toner;
a controller for controlling the color converter and the image forming section, an image processing that comprises the color converter and that processes an inputted image signal and outputs a processed image to the image forming section, wherein
brightness of a cyan toner simple color image that has maximum chroma is between 53 and 70,
brightness of a magenta toner simple color image that has maximum chroma is between 31 and 51,
chroma of a gray toner simple color image is equal to 10 or less, and brightness of the gray toner simple color image is between 30 and 90, and
wherein the color converter comprises one of (a) a three-dimensional LUT color converter and (b) a four-dimensional LUT color converter and an equivalent neutral density inverse convert, defined as follows:
(a) a three-dimensional LUT color converter for
converting the first image signal to the second image signal by using a three-dimensional LUT for performing a conversion processing same as a processing of converting the cyan component, the magenta component and the yellow component of the first image signal to the equivalent neutral density cyan component, the equivalent neutral density magenta component and the equivalent neutral density yellow component, calculating a first gray component from the equivalent neutral density cyan component, the equivalent neutral density magenta component and the equivalent neutral density yellow component which are converted, subtracting the first gray component from each of the equivalent neutral density cyan component, the equivalent neutral density magenta component and the equivalent neutral density yellow component and performing the inverse conversion of the conversion to the equivalent neutral density on each of the equivalent neutral density cyan component, the equivalent neutral density magenta component and the equivalent neutral density yellow component from which the first gray component is subtracted, and
(b) a four-dimensional LUT color converter for
converting the first image signal by using a four-dimensional LUT for performing a conversion processing same as a processing of converting the cyan component, the magenta component and the yellow component of the first image signal to the equivalent neutral density cyan component, the equivalent neutral density magenta component and the equivalent neutral density yellow component, calculating the first gray component from the equivalent neutral density cyan component, the equivalent neutral density magenta component and the equivalent neutral density yellow component, subtracting the first gray component from each of the equivalent neutral density cyan component, the equivalent neutral density magenta component and the equivalent neutral density yellow component, calculating a second gray component from the first black component, subtracting the second gray component from the first black component, and adding the first pray component and the second gray component; and an equivalent neutral density inverse converter for executing the inverse conversion of the conversion of the equivalent neutral density on each of the equivalent neutral density cyan component, the equivalent neutral density magenta component and the equivalent neutral density yellow component after the conversion processing is performed by the four-dimensional LUT color converted by using a LUT.

2. The image forming apparatus of claim 1, wherein the color converter comprises:

an equivalent neutral density converter for converting the cyan component, the magenta component and the yellow component of the first image signal to the equivalent neutral density cyan component, the equivalent neutral density magenta component and the equivalent neutral density yellow component by using a LUT;

a gray replacing processor for
calculating the first gray component from the equivalent neutral density cyan component, the equivalent neutral density magenta component and the equivalent neutral density yellow component which are converted by the equivalent neutral density converter, and subtracting the first gray component from each of the equivalent neutral density cyan component, the equivalent neutral density magenta component and the equivalent neutral density yellow component of the equivalent neutral density; and an equivalent neutral density inverse converter for executing the inverse conversion of the conversion to the equivalent neutral density on each of the equivalent neutral density cyan component, the equivalent neutral density magenta component and the equivalent neutral density yellow component from which the first gray component is subtracted by the gray replacing processor by using a LUT.

3. The image forming apparatus of claim 2, wherein the color converter further comprises:

a calculator for
calculating a second black component and a second gray component from the first black component and replacing the first black component to the second black component and the second gray component; and an adder for adding the first gray component and the second gray component.

4. The image forming apparatus of claim 1, wherein brightness of a toner image that has maximum chroma in a yellow toner simple color image is between 80 and 90.

5. An image forming method comprising:

color converting in which a cyan component, a magenta component and a yellow component of a first image signal comprising the cyan component, the magenta component, the yellow component and a first black component are converted to equivalent neutral density, a first gray component is calculated from an equivalent neutral density cyan component, an equivalent neutral density magenta component and an equivalent neutral density yellow component, the first gray component is subtracted from each of the equivalent neutral density cyan component, the equivalent neutral density magenta component and the equivalent neutral density yellow component, each of the equivalent neutral density cyan component, the equivalent neutral density magenta component and the equivalent neutral density yellow component from which the first gray component is subtracted is subjected to an inverse conversion of a conversion to the equivalent neutral density, and a second image signal comprising a cyan component, a magenta component and a yellow component which are obtained by carrying out the inverse conversion to the equivalent neutral density cyan component, the equivalent neutral density magenta component and the equivalent neutral density yellow component from which the first gray component is subtracted, the first black component and the first gray component is output; and image forming in which an image is formed on a paper based on the second image signal by using a cyan toner, a magenta toner, a yellow toner, a black toner and a gray toner by an image forming section, wherein brightness of a cyan toner simple color image that has maximum chroma is between 53 and 70, brightness of a magenta toner simple color image that has maximum chroma is between 31 and 51, chrome of a gray toner simple color image is equal to 10 or less, and brightness of the gray toner simple color image is between 30 and 90, and wherein the color converting comprises one of (a) three-dimensional LUT color converting and (b) a set of four-dimensional LUT color converting and equivalent neutral density inverse converting, defined as follows:

(a) three-dimensional LUT color converting for
converting the first image signal to the second image signal by using a three-dimensional LUT for performing a conversion processing same as a processing of converting the cyan component, the magenta component and the yellow component of the first image signal to the equivalent neutral density cyan component, the equivalent neutral density magenta component and the equivalent neutral density yellow component, calculating a first gray component from the equivalent neutral density cyan component, the equivalent neutral density magenta component and the equivalent neutral density yellow component which are converted, subtracting the first gray component from each of the equivalent neutral density cyan component, the equivalent neutral density magenta component and the equivalent neutral density yellow component, and performing the inverse conversion of the conversion to the equivalent neutral density on each of the equivalent neutral density cyan component, the equivalent neutral density magenta component and the equivalent neutral density yellow component from which the first gray component is subtracted, and (b) a set of four-dimensional LUT color converting for
converting the first image signal by using a four-dimensional LUT performing a conversion processing same as a processing of converting the cyan component, the magenta component and the yellow component of the first image signal to the equivalent neutral density cyan component, the equivalent neutral density magenta component and the equivalent neutral density yellow component, calculating the first gray component from the equivalent neutral density cyan component, the equivalent neutral density magenta component and the equivalent neutral density yellow component, subtracting the first gray component from each of the equivalent neutral density cyan component, the equivalent neutral density magenta component and the equivalent neutral density yellow component, calculating a second gray component from the first black component, subtracting the second gray component from the first black component, and adding the first gray component and the second gray component; and equivalent neutral density inverse converting for executing the inverse conversion of the conversion of the equivalent neutral density on each of the equivalent neutral density cyan component, the equivalent neutral density magenta component and the equivalent neutral density yellow component after the conversion processing is performed by the four-dimensional LUT color converting by using a LUT.

\* \* \* \* \*